United States Patent
Sekiguchi et al.

(10) Patent No.: US 10,198,830 B2
(45) Date of Patent: Feb. 5, 2019

(54) PARALLAX OPERATION SYSTEM, INFORMATION PROCESSING APPARATUS, INFORMATION PROCESSING METHOD, AND RECORDING MEDIUM

(71) Applicants: Hiroyoshi Sekiguchi, Kanagawa (JP); Soichiro Yokota, Kanagawa (JP); Shuichi Suzuki, Kanagawa (JP); Shin Aoki, Kanagawa (JP); Haike Guan, Kanagawa (JP); Jun Yoshida, Tokyo (JP); Mitsuru Nakajima, Kanagawa (JP); Hideomi Fujimoto, Kanagawa (JP)

(72) Inventors: Hiroyoshi Sekiguchi, Kanagawa (JP); Soichiro Yokota, Kanagawa (JP); Shuichi Suzuki, Kanagawa (JP); Shin Aoki, Kanagawa (JP); Haike Guan, Kanagawa (JP); Jun Yoshida, Tokyo (JP); Mitsuru Nakajima, Kanagawa (JP); Hideomi Fujimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 367 days.

(21) Appl. No.: 15/102,704

(22) PCT Filed: Dec. 22, 2014

(86) PCT No.: PCT/JP2014/084742
§ 371 (c)(1),
(2) Date: Jun. 8, 2016

(87) PCT Pub. No.: WO2015/099193
PCT Pub. Date: Jul. 2, 2015

(65) Prior Publication Data
US 2018/0165834 A1 Jun. 14, 2018

(30) Foreign Application Priority Data

Dec. 26, 2013 (JP) ................................. 2013-268506
Dec. 19, 2014 (JP) ................................. 2014-256864

(51) Int. Cl.
*G06K 9/00* (2006.01)
*G06T 7/00* (2017.01)
(Continued)

(52) U.S. Cl.
CPC ................ *G06T 7/97* (2017.01); *G01S 11/12* (2013.01); *G01S 17/023* (2013.01); *G01S 17/08* (2013.01);
(Continued)

(58) Field of Classification Search
None
See application file for complete search history.

(56) References Cited

U.S. PATENT DOCUMENTS 4,573,191 A * 2/1986 Kidode ................. G01C 11/00
 382/106
4,601,053 A * 7/1986 Grumet ................. G01C 3/085
 382/106

(Continued)

FOREIGN PATENT DOCUMENTS

JP   2001-141457   5/2001
JP   3212218   9/2001
(Continued)

OTHER PUBLICATIONS

Extended European Search Report dated Dec. 6, 2016 in Patent application No. 14875832.9.
(Continued)

*Primary Examiner* — Jayesh A Patel
(74) *Attorney, Agent, or Firm* — Oblon, McClelland, Maier & Neustadt, L.L.P.

(57) ABSTRACT

An information processing apparatus includes a correlation unit that correlates distance information indicating a dis-
(Continued)

tance to an emission position of electromagnetic waves emitted in a shooting direction of a plurality of image pickup units with a first pixel in a first image that constitutes images taken by the image pickup units, the distance information being obtained based on reflected waves of the electromagnetic waves and the first pixel corresponding to the emission position of the electromagnetic waves, and a generation unit that generates a parallax image by using the distance information correlated with the first pixel for parallax computation of pixels in a second image that constitutes the images.

12 Claims, 23 Drawing Sheets

(51) Int. Cl.
*G01S 11/12* (2006.01)
*G01S 17/02* (2006.01)
*G01S 17/08* (2006.01)
*G06F 17/15* (2006.01)
*G08G 1/16* (2006.01)

(52) U.S. Cl.
CPC .... *G06F 17/15* (2013.01); *G06T 2207/10012* (2013.01); *G08G 1/16* (2013.01)

(56) References Cited

U.S. PATENT DOCUMENTS

| | | | |
|---|---|---|---|
| 5,633,705 A | 5/1997 | Asayama | |
| 6,570,566 B1* | 5/2003 | Yoshigahara | G06T 15/10 345/427 |
| 7,091,837 B2* | 8/2006 | Nakai | G06K 9/00805 340/425.5 |
| 8,174,563 B2* | 5/2012 | Saito | G01C 11/06 348/169 |
| 8,605,153 B2 | 12/2013 | Sasaki et al. | |
| 8,994,791 B2* | 3/2015 | Kim | H04N 13/20 348/46 |
| 9,200,895 B2* | 12/2015 | Ichitani | G02B 27/1066 |
| 2006/0126918 A1* | 6/2006 | Oohashi | G05D 1/0251 382/153 |
| 2010/0328427 A1 | 12/2010 | Sakano et al. | |
| 2011/0187831 A1* | 8/2011 | Kim | H04N 13/20 348/46 |
| 2011/0293172 A1* | 12/2011 | Sakamoto | H04N 13/128 382/154 |
| 2012/0242835 A1 | 9/2012 | Li et al. | |
| 2012/0268602 A1 | 10/2012 | Hirai et al. | |
| 2013/0088578 A1 | 4/2013 | Umezawa et al. | |
| 2013/0250065 A1* | 9/2013 | Aoki | G06K 9/00791 348/46 |
| 2014/0198104 A1* | 7/2014 | Tanaka | G06T 15/50 345/426 |

FOREIGN PATENT DOCUMENTS

| | | |
|---|---|---|
| JP | 2005-250994 A | 9/2005 |
| JP | 2008-082870 | 4/2008 |
| JP | 2009-47496 A | 3/2009 |
| JP | 4265931 | 5/2009 |
| JP | 2012-8026 A | 1/2012 |
| JP | 2012-181142 | 9/2012 |
| JP | 2013-093013 | 5/2013 |
| JP | 2013-174547 | 9/2013 |
| WO | WO 2010/113389 A1 | 10/2010 |

OTHER PUBLICATIONS

International Search Report dated on Apr. 7, 2015 in PCT/JP2014/084742 filed on Dec. 22, 2014.

Heiko Hirschmueller, Accurate and Efficient Stereo Processing by Semi-Global Matching and Mutual Information, Computer Vision and Pattern Recognition, 2005.CVPR 2005.IEEE Computer Society Conference, Jun. 20, 2005, vol. 2, ( 9 Total Pages).

Examination Report dated Dec. 13, 2018 in corresponding Indian Patent Application No. 201637018738.

* cited by examiner

SHOOTING RANGE

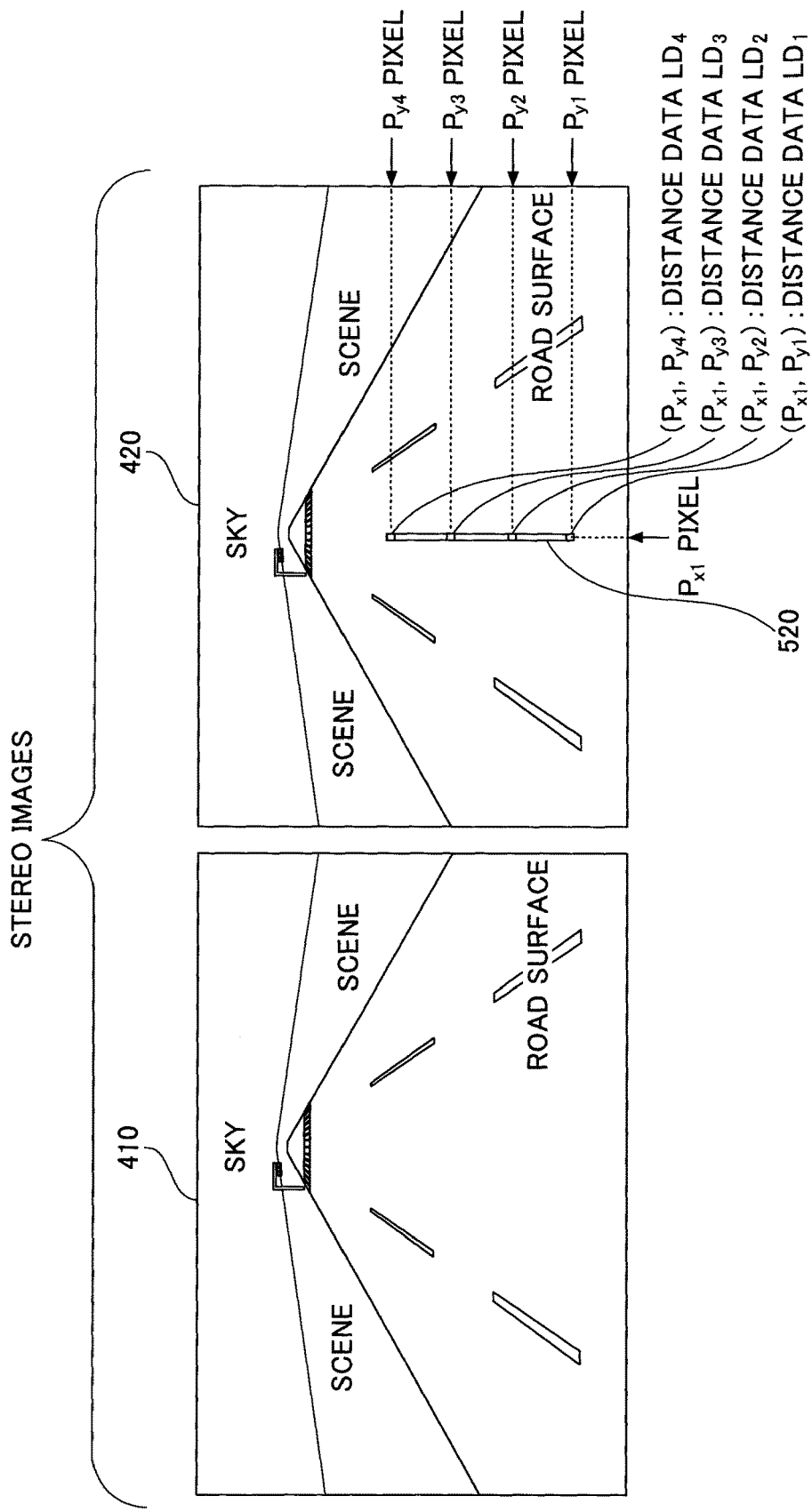

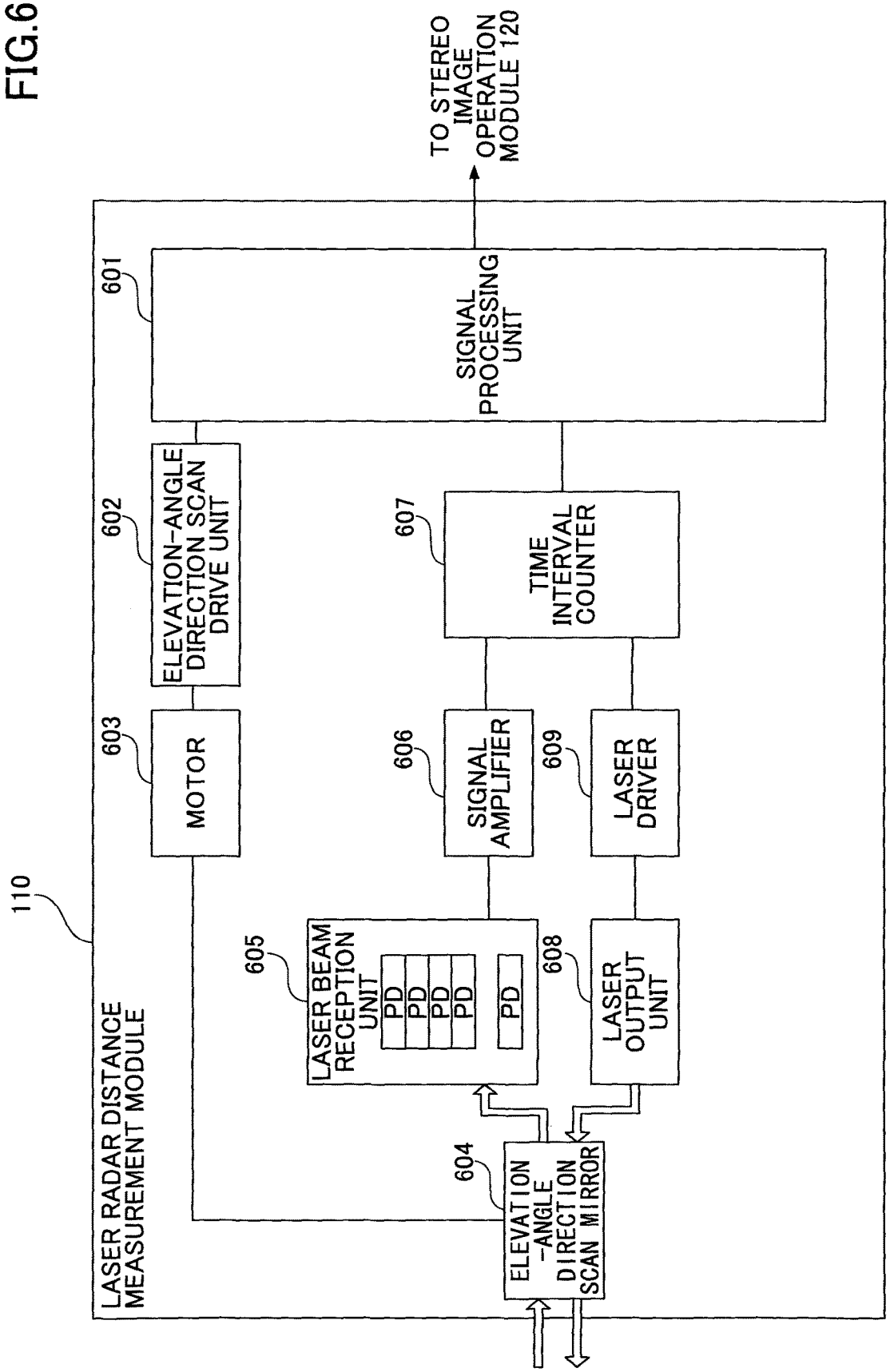

FIG.9
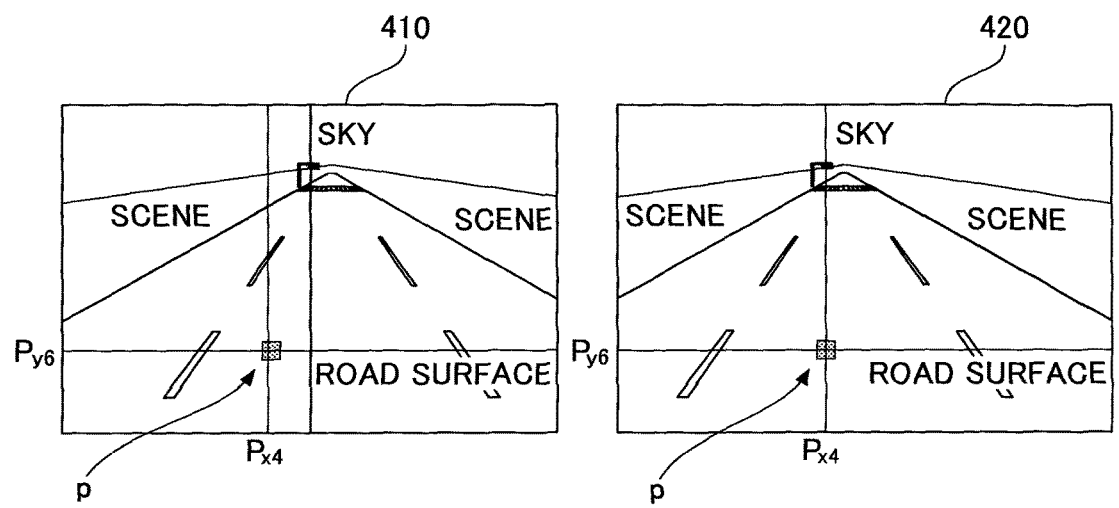
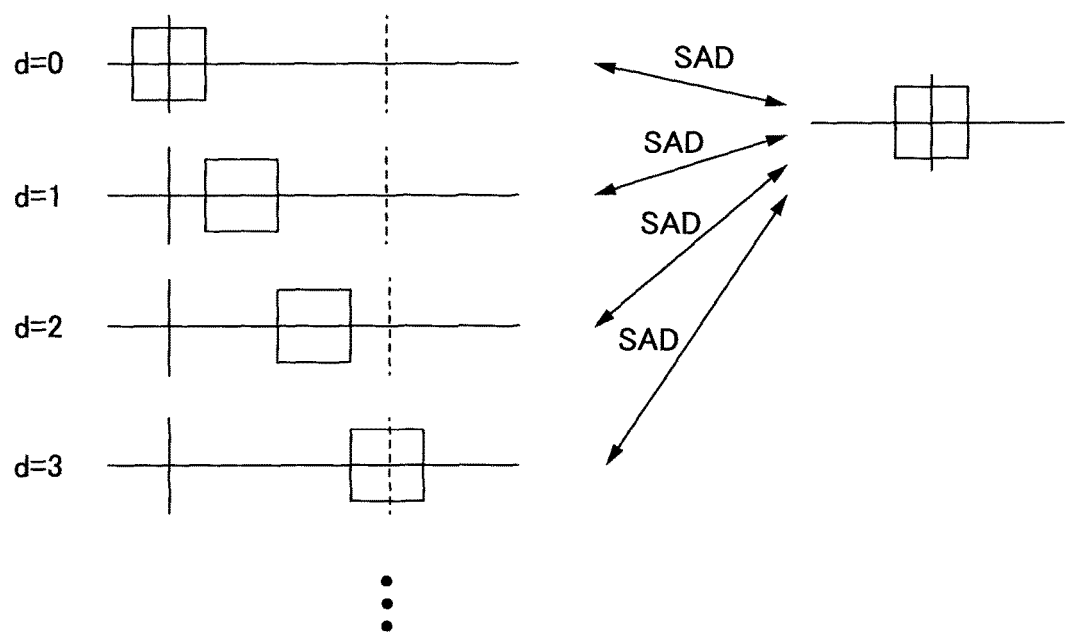

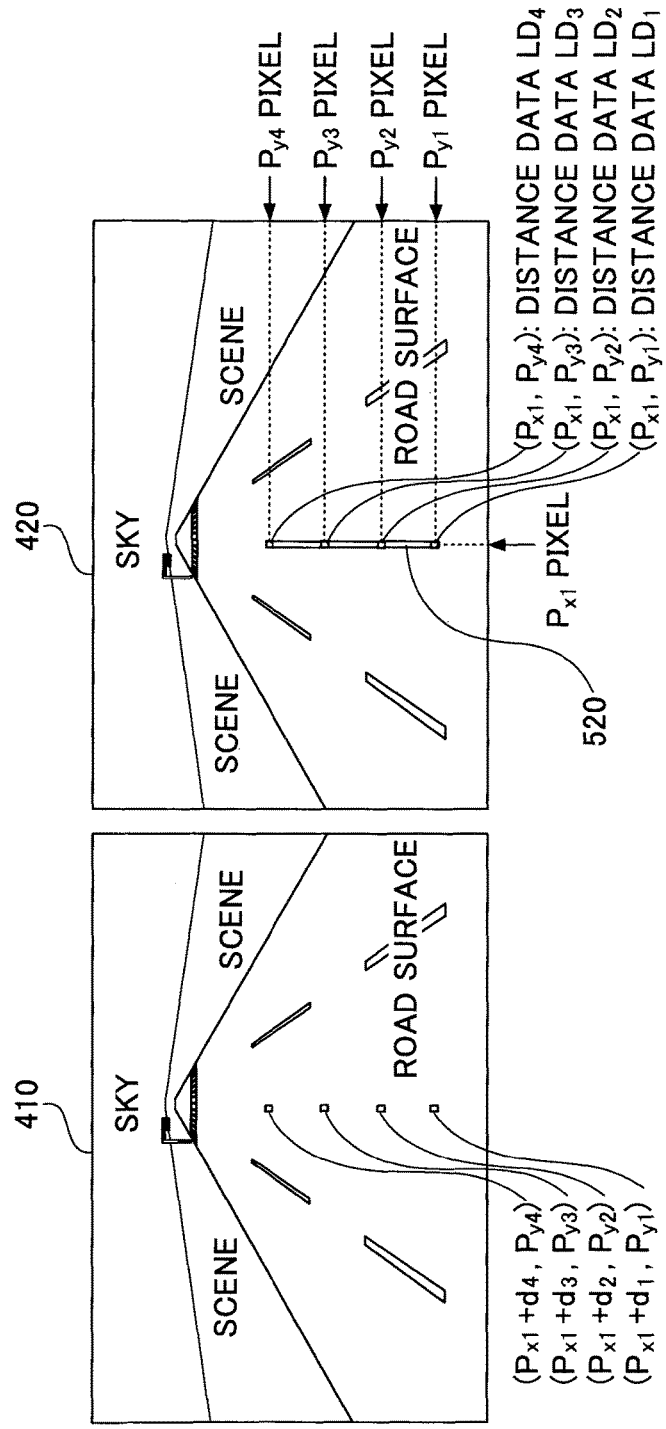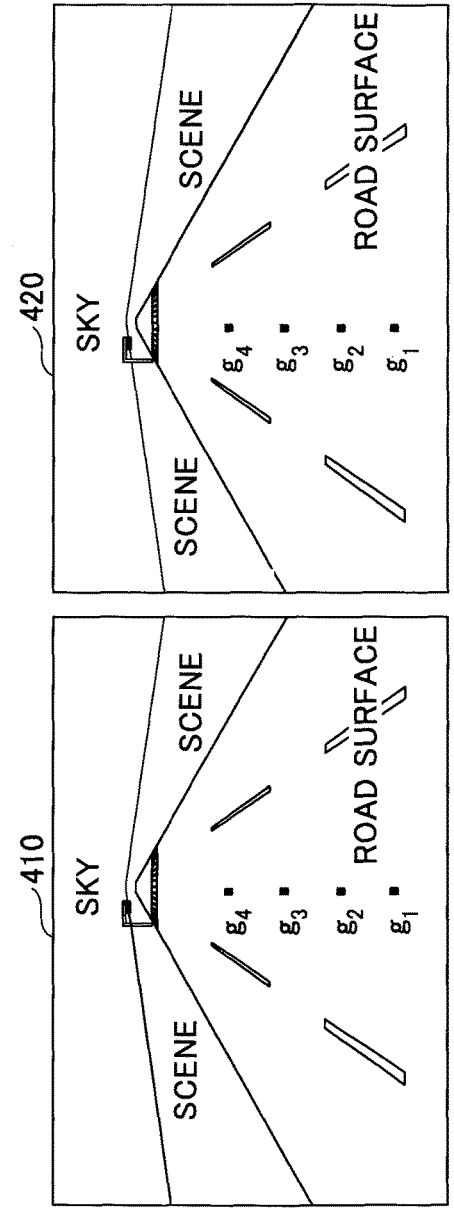
FIG.21A
FIG.21B

PARALLAX OPERATION SYSTEM, INFORMATION PROCESSING APPARATUS, INFORMATION PROCESSING METHOD, AND RECORDING MEDIUM

TECHNICAL FIELD

The present invention relates to a parallax operation system, an information processing apparatus, an information processing method, and a recording medium.

BACKGROUND ART

Conventionally, a distance measurement technique for computing a distance to an object by performing parallax computation on images of the object included in images (stereo images) taken by a plurality of image pickup units of stereo cameras, etc., is known. The use of a parallax image produced by the distance measurement technique facilitates, for example, detection of an obstruction ahead of a running vehicle.

SUMMARY OF THE INVENTION

Problems to be Solved by the Invention

However, stereo images on which parallax computation is performed usually include an image portion with smooth texture, a saturated image portion, a solidly shaded image portion, etc. In a case of the stereo images including such image portions, it is difficult to ensure matching accuracy between the stereo images and the accuracy of the parallax computation is remarkably degraded. For this reason, in the field of the distance measurement technique, it is demanded to allow performance of parallax computation with good accuracy even when the stereo images include an image portion with smooth texture, a saturated image portion, a solidly shaded image portion, etc.

Accordingly, in view of the above-described problems, the present invention aims at increasing the accuracy of parallax computation of images taken by a plurality of image pickup units.

Means for Solving the Problems

In an aspect, the present invention provides an information processing apparatus which is able to increase the accuracy of parallax computation of stereo images taken by a plurality of image pickup units.

In an embodiment, the present invention provides an information processing apparatus which generates a parallax image based on images taken by a plurality of image pickup units, the information processing apparatus including a processor and a memory storing computer readable code that, when executed by the processor, causes the processor to act as a correlation unit configured to correlate distance information indicating a distance to an emission position of electromagnetic waves emitted in a shooting direction of the image pickup units with a first pixel in a first image that constitutes the images, the distance information being obtained based on reflected waves of the electromagnetic waves and the first pixel corresponding to the emission position of the electromagnetic waves; and a generation unit configured to generate a parallax image by using the distance information correlated with the first pixel for parallax computation of pixels in a second image that constitutes the images.

According to an embodiment of the present invention, it is possible to increase the accuracy of parallax computation of stereo images taken by a plurality of image pickup units.

Other objects, features and advantages of embodiments will be apparent from the following detailed description when read in conjunction with the accompanying drawings.

BRIEF DESCRIPTION OF THE DRAWINGS

FIG. 5 is a diagram for explaining a relationship between an emission position of a laser beam and a pixel position of a stereo image by the laser radar distance measurement module.

FIG. 6 is a block diagram showing a functional configuration of the laser radar distance measurement module.

FIG. 9 is a diagram for explaining a cost computation process performed by the cost computation unit.

FIGS. 21A and 21B are diagrams for explaining an information embedding process performed by an information embedding unit which constitutes a part of the stereo image operation module.

MODE FOR CARRYING OUT THE INVENTION

A description will now be given of embodiments with reference to the accompanying drawings.

First Embodiment

Figure 1:
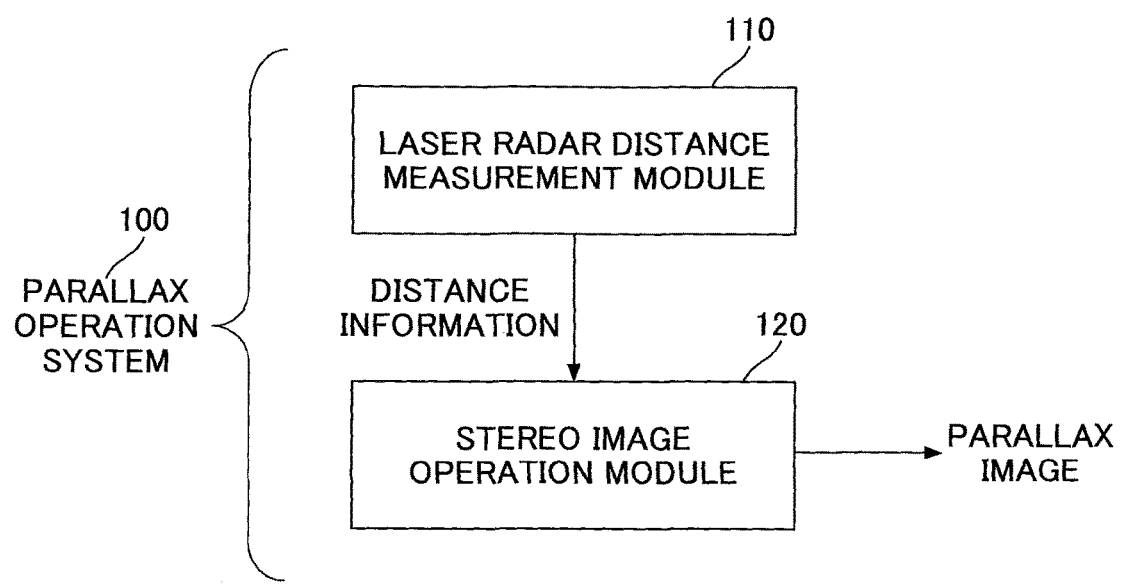
FIG. 1 is a block diagram showing an overall configuration of a parallax operation system according to an embodiment.

First, an overall configuration of a parallax operation system according to an embodiment is explained. FIG. 1 is a diagram showing an overall configuration of the parallax operation system 100 according to this embodiment. As shown in FIG. 1, the parallax operation system 100 includes a laser radar distance measurement module 110 and a stereo image operation module 120.

The laser radar distance measurement module 110 is configured to emit a laser beam in a shooting direction when taking stereo images by stereo cameras which constitute the stereo image operation module 120, and configured to receive a reflected beam to measure a distance to the reflection position of the laser beam. The distance measured by the laser radar distance measurement module 110 and beam reception timing information are input to the stereo image operation module 120 as distance information.

The stereo image operation module 120 includes stereo cameras and computes a parallax image based on the stereo images taken with a predetermined frame period by the stereo cameras. The stereo image operation module 120 is configured to identify a frame based on the reflection timing information included in the distance information when computing a parallax image. Furthermore, the stereo image operation module 120 is configured to correlate the distance data included in the distance information with a pixel corresponding to the emission position of the laser beam in the corresponding frame of the stereo images. The stereo image operation module 120 is configured to use the distance data (the value computed based on the distance data) correlated with the corresponding pixel in the computation of the parallax image.

Thus, in the computation of the parallax image, the accuracy of parallax computation may be increased by using the distance measured by the laser radar distance measurement module 110.

For example, the parallax image computed by the stereo image operation module 120 enables accurate detection of an object, a person, etc., on a road surface ahead of a vehicle running on the road. On the other hand, in a case of an image portion with smooth texture, such as a road surface, the accuracy of parallax computation is degraded. To avoid this, the stereo image operation module 120 is configured to use the distance measured by the laser radar distance measurement module 110 in the computation of the parallax image.

Figure 2:
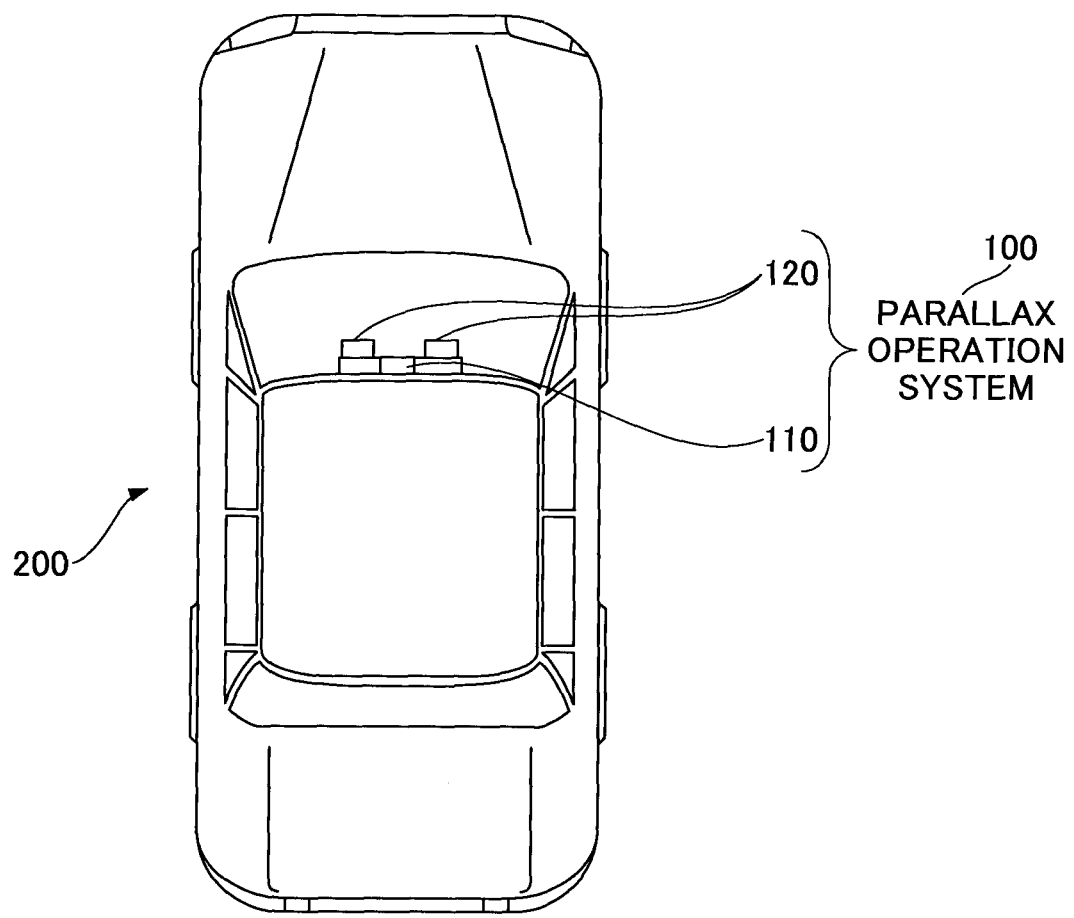
FIG. 2 is a diagram showing a vehicle to which the parallax operation system according to the embodiment is applied.

Next, an example of application of the parallax operation system 100 is explained. FIG. 2 is a diagram showing a vehicle 200 to which the parallax operation system 100 according to the embodiment is applied. In the example of FIG. 2, the laser radar distance measurement module 110 and the stereo image operation module 120 are mounted at internal middle positions of a front window of the vehicle 200. The laser radar distance measurement module 110 and the stereo image operation module 120 are mounted to face a forward direction of the vehicle 200, and the laser radar distance measurement module 110 is arranged between the stereo cameras (the two image pickup units) which constitute a part of the stereo image operation module 120.

Figure 3A:
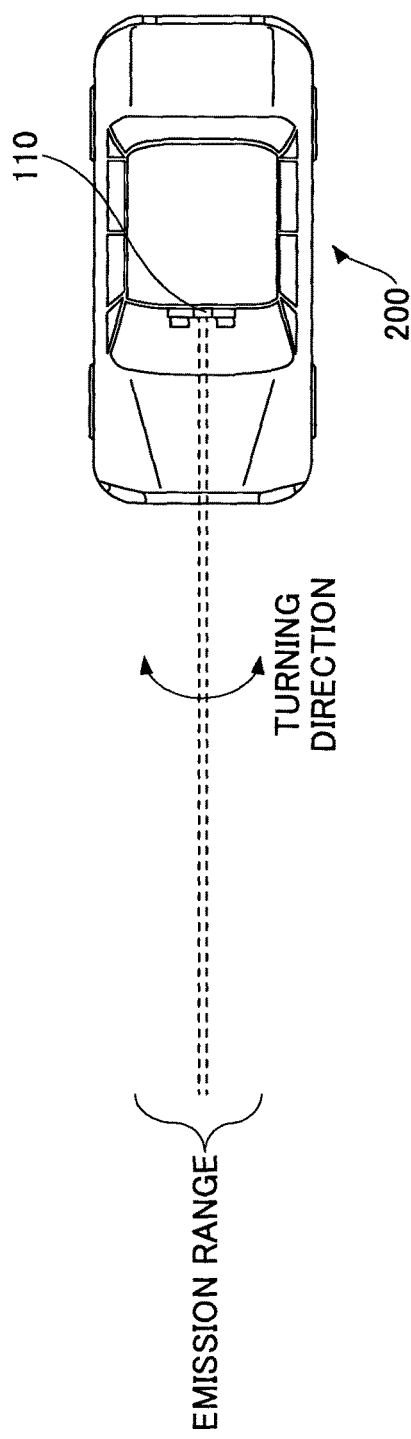
FIGS. 3A and 3B are diagrams showing an emission range of a laser beam by a laser radar distance measurement module which constitutes a part of the parallax operation system.
Figure 3B:
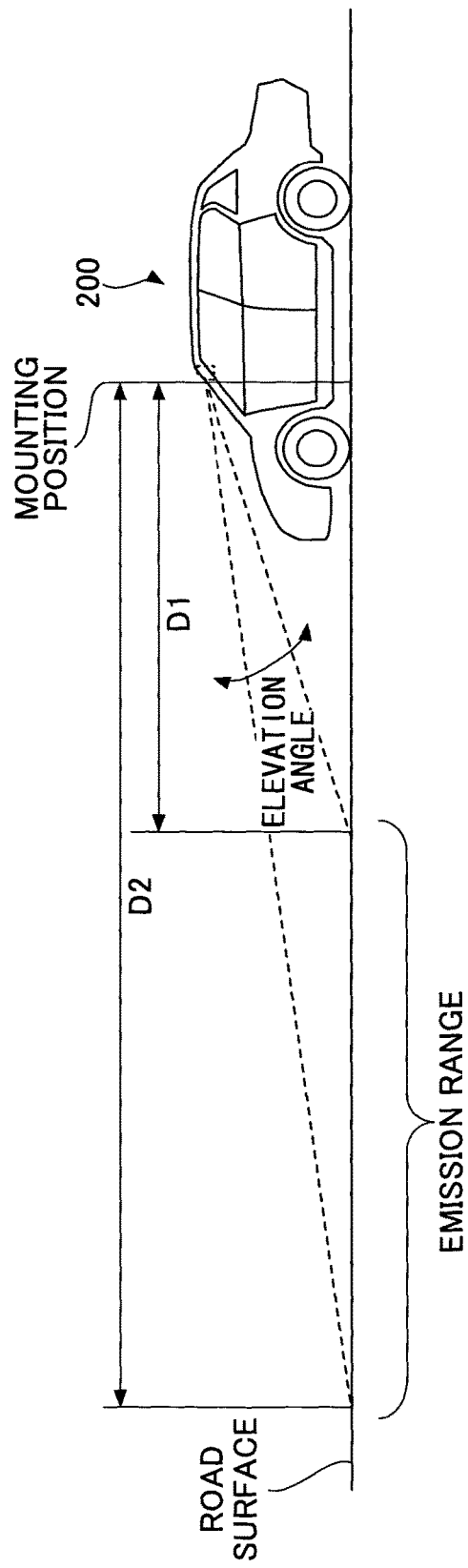

Next, an emission range of a laser beam by the laser radar distance measurement module 110 is explained. FIGS. 3A and 3B are diagrams showing an emission range of a laser beam by the laser radar distance measurement module 110. FIG. 3A is a top view of the vehicle 200 and FIG. 3B is a side view of the vehicle 200.

As shown in FIG. 3A, the laser radar distance measurement module 110 emits a laser beam linearly in the forward direction of the vehicle 200. An emission angle of the laser beam in a turning direction (which is parallel to a horizontal direction) when the vehicle 200 is viewed from an upper position thereof is fixed to an angle of 0° when the direction of travel of the vehicle 200 is defined as an angle of 0°.

Moreover, the laser radar distance measurement module 110 emits laser beams toward a road surface portion ahead of the vehicle 200. Specifically, as shown in FIG. 3B, an emission range of the laser beams by the laser radar distance measurement module 110 on the road surface is set from a distance D1 to a distance D2 measured with respect to a mounting position of the laser radar distance measurement module 110.

Namely, the laser radar distance measurement module 110 is mounted so that the emission direction of the laser beams may be rotated in an elevation-angle direction (which is parallel to a vertical direction). Thereby, the laser beams may be emitted to the road surface in the emission range from the distance D1 to the distance D2 measured from the mounting position of the laser radar distance measurement module 110.

Figure 4A:
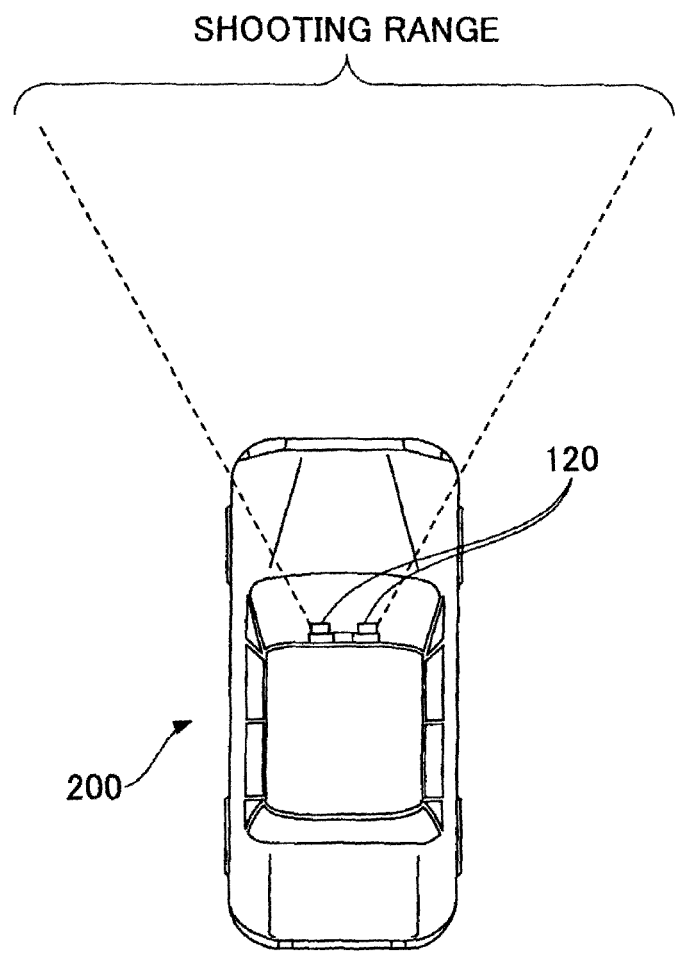
FIGS. 4A, 4B and 4C are diagrams showing a shooting range of stereo images by a stereo image operation module which constitutes a part of the parallax operation system.
Figure 4B:
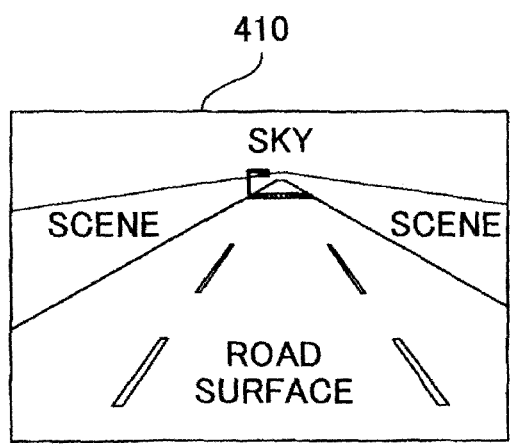
Figure 4C:
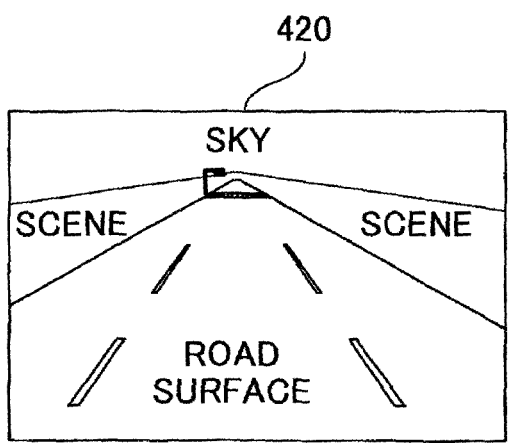

Next, a shooting range of the stereo image by the stereo image operation module 120 is explained. FIGS. 4A, 4B and 4C are diagrams for explaining a shooting range of stereo images by the stereo image operation module 120. FIG. 4A is a top view of the vehicle 200 when viewed from an upper portion thereof. As shown in FIG. 4A, the stereo cameras of the stereo image operation module 120 are mounted to face the forward direction of the vehicle 200 and take images (which include the road surface and the sky) in the forward direction of the vehicle.

FIG. 4B and FIG. 4C show one frame of each of stereo images taken by the stereo cameras. FIG. 4B shows one frame of a stereo image taken by a left image pickup unit mounted on the left-hand side of the image pickup units which constitute the stereo cameras of the stereo image operation module 120. FIG. 4C shows one frame of a stereo image taken by a right image pickup unit mounted on the right-hand side of the image pickup units which constitute the stereo cameras of the stereo image operation module 120.

The left image pickup unit and the right image pickup unit are arrayed parallel to each other at a known distance between the two image pickup units. Hence, a position of an object within a stereo image 410 shown in FIG. 4B and a position of the same object within a stereo image 420 shown in FIG. 4C deviate from each other in the horizontal direction.

The stereo image operation module 120 is configured to generate and output a parallax image by computing an amount of deviation between each of the pixels which constitute the object in the image 410 and a corresponding one of the pixels which constitute the object in the image 420 (which is called "parallax").

Next, a relationship between an emission position of a laser beam by the laser radar distance measurement module 110 and a pixel position of a stereo image (reference image) taken by the stereo image operation module 120 is explained. FIG. 5 is a diagram for explaining the relationship between the emission position of the laser beam and the pixel position of the stereo image (reference image).

As described above, the laser radar distance measurement module 110 is mounted between the stereo cameras (the two image pickup units) of the stereo image operation module 120, so that the emission angle of laser beam by the laser radar distance measurement module 110 in the turning direction is fixed to the angle of 0°, and the laser radar distance measurement module 110 is mounted to be rotatable in the elevation-angle direction.

Hence, the emission range of the laser beam in the image 420 corresponds to an image portion indicated by an emission range 520 in FIG. 5. Namely, pixels at predetermined positions in the image 420 are pixels at the corresponding positions in the emission range 520.

In this embodiment, it is assumed that the pixel of $(P_{x1}, P_{y1})$, the pixel of $(P_{x1}, P_{y2})$, the pixel of $(P_{x1}, P_{y3})$, and the pixel of $(P_{x1}, P_{y4})$ correspond to the positions where the distances have been measured. Hence, the distances measured by the laser radar distance measurement module 110 may be correlated with these pixels.

In the image 420 shown in FIG. 5, distance data $LD_1$ is correlated with the pixel of $(P_{x1}, P_{y1})$, distance data $LD_2$ is correlated with the pixel of $(P_{x1}, P_{y2})$, distance data $LD_3$ is correlated with the pixel of $(P_{x1}, P_{y3})$, and distance data $LD_4$ is correlated with the pixel of $(P_{x1}, P_{y4})$.

Because the distance data $LD_1$-$LD_4$ are correlated with the pixels $(P_{x1}, P_{y1})$, $(P_{x1}, P_{y2})$, $(P_{x1}, P_{y3})$, and $(P_{x1}, P_{y4})$ in the image 420, parallaxes of pixels in the image 410 (comparison image) corresponding to these pixels with respect to these pixels in the image 420 (reference image) may be computed. Specifically, a parallax of the pixel $(P_{x1}, P_{y1})$ in the image 410 may be computed based on the distance data $LD_1$ and the known distance between the stereo cameras. Similarly, a parallax of the pixel $(P_{x1}, P_{y2})$ in the image 410 may be computed based on the distance data $LD_2$ and the known distance between the stereo cameras, a parallax of the pixel $(P_{x1}, P_{y3})$ in the image 410 may be computed based on the distance data $LD_3$ and the known distance between the stereo cameras, and a parallax of the pixel $(P_{x1}, P_{y4})$ in the image 410 may be computed based on the distance data $LD_4$ and the known distance between the stereo cameras.

Next, a functional configuration of the laser radar distance measurement module 110 is explained. FIG. 6 is a block diagram showing the functional configuration of the laser radar distance measurement module 110.

As shown in FIG. 6, in the laser radar distance measurement module 110, in response to receiving an instruction from a signal processing unit 601, an elevation-angle direction scan drive unit 602 drives a motor 603 to rotate an elevation-angle direction scan mirror 604 in an elevation-angle direction. Thereby, the elevation-angle direction scan mirror 604 is rotated in the elevation-angle direction.

In the laser radar distance measurement module 110, in response to receiving an instruction from the signal processing unit 601, a laser driver 609 drives a laser output unit 608 to output a laser beam. At this time, the timing of outputting a laser beam is temporarily stored in a time interval counter 607. The laser beam output by the laser output unit 608 is reflected to the outside by the elevation-angle direction scan mirror 604 which is rotated in the elevation-angle direction, so that the emission of the reflected laser beam covers a predetermined emission range.

The laser beam output by the laser radar distance measurement module 110 is reflected at the emission position on the road surface, and the reflected beam is received by a laser beam reception unit 605 through the elevation-angle direction scan mirror 604. The laser beam reception unit 605 includes a plurality of photodetectors (PD) which are arrayed in the vertical direction, the reflected beam is received by any of the photodetectors and the received beam is converted into an electric signal by the relevant photodetector.

The converted signal is amplified by a signal amplifier 606 and the amplified signal from the signal amplifier 605 is input to a time interval counter 607. The time interval counter 607 computes a time interval based on the timing of outputting the laser beam by the laser output unit 608 and the timing of receiving the reflected beam by the laser beam reception unit 605.

The time interval computed by the time interval counter 607 is converted into distance data by the signal processing unit 601, and the signal processing unit 601 transmits distance information indicating the distance data and reception timing information indicating the reception timing to the stereo image operation module 120.

Figure 7:
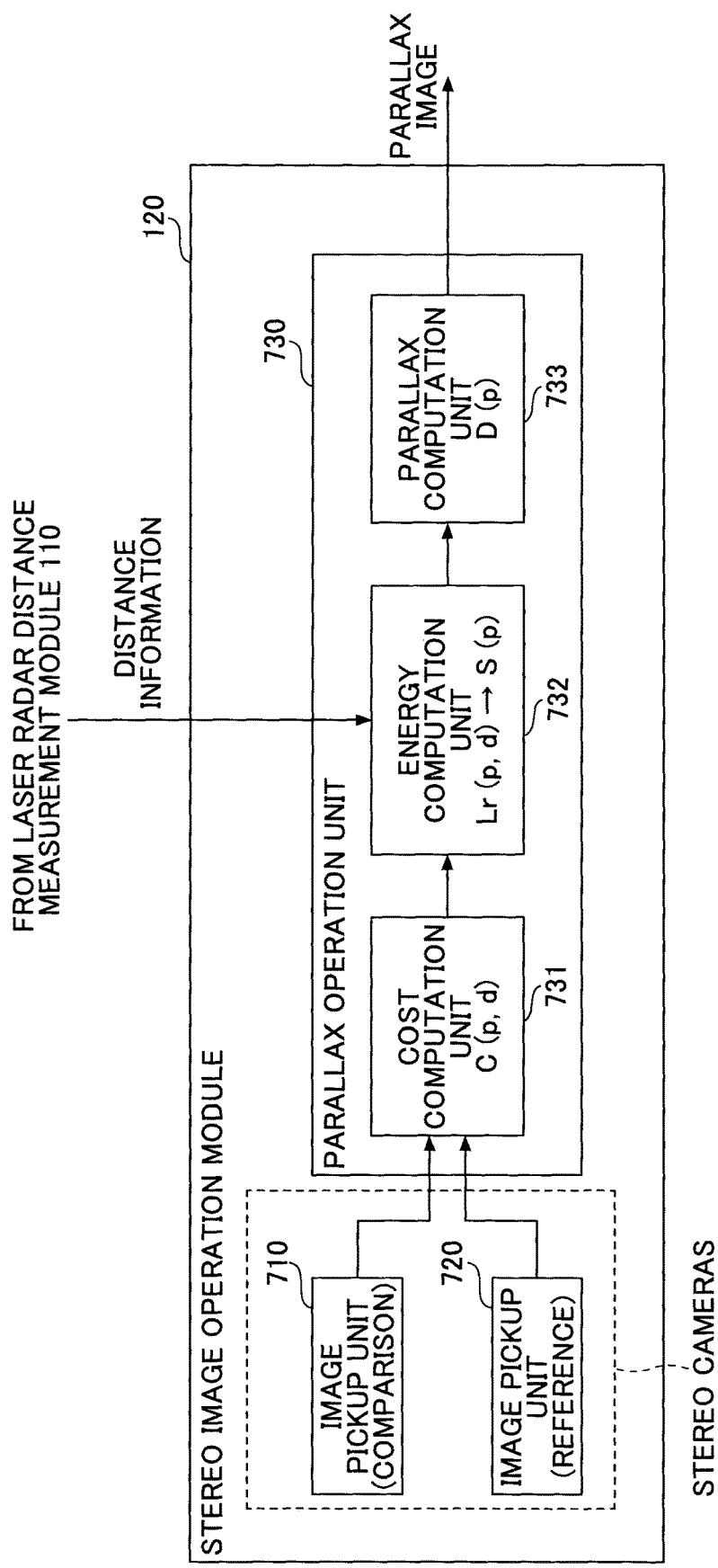
FIG. 7 is a block diagram showing a functional configuration of the stereo image operation module.

Next, a functional configuration of the stereo image operation module 120 is explained. FIG. 7 is a block diagram showing the functional configuration of the stereo image operation module 120.

As shown in FIG. 7, the stereo image operation module 120 includes an image pickup unit 710, an image pickup unit 720, and a parallax operation unit 730. The parallax operation unit 730 constitutes an information processing apparatus according to this embodiment. The image pickup unit 710 and the image pickup unit 720 constitute the stereo cameras.

In this embodiment, the image taken by the image pickup unit 710 is used as a comparison image, and the image taken by the image pickup unit 720 is used as a reference image.

The parallax operation unit 730 includes a cost computation unit 731, an energy computation unit 732, and a parallax computation unit 733. In the following, each of the cost computation unit 731, the energy computation unit 732, and the parallax computation unit 733 which constitute the parallax operation unit 730 will be explained. The cost computation unit 731, the energy computation unit 732, and the parallax computation unit 733 which will be explained below may be implemented by one or more dedicated electronic circuits. Alternatively, the functions of the units 731-733 may be implemented by a computer (or a processor or CPU of the stereo image operation module 120) executing a program representing computer readable code that causes the computer to perform the functions of the units 731-733.

The cost computation unit 731 performs a cost computation process. Specifically, the cost computation process performed by the cost computation unit 731 computes a cost $C(p, d)$ of each of the pixels which constitute the image (comparison image) by acquiring the image (comparison image) taken by the image pickup unit 710 and the image (reference image) taken by the image pickup unit 720, and comparing both the images.

The cost is an index which indicates a degree of coincidence of one (comparison image) of the two images (comparison image and reference image) with the other image (reference image) when the one image (comparison image) is shifted in the horizontal right/left direction, the two images constituting the stereo images. SAD (sum of absolute differences) may be used as an example of the cost. However, the cost is not limited to SAD. For example, SSD (sum of squared differences), NCC (normalized cross-correlation), etc., may be used as another example of the cost.

Figure 8:
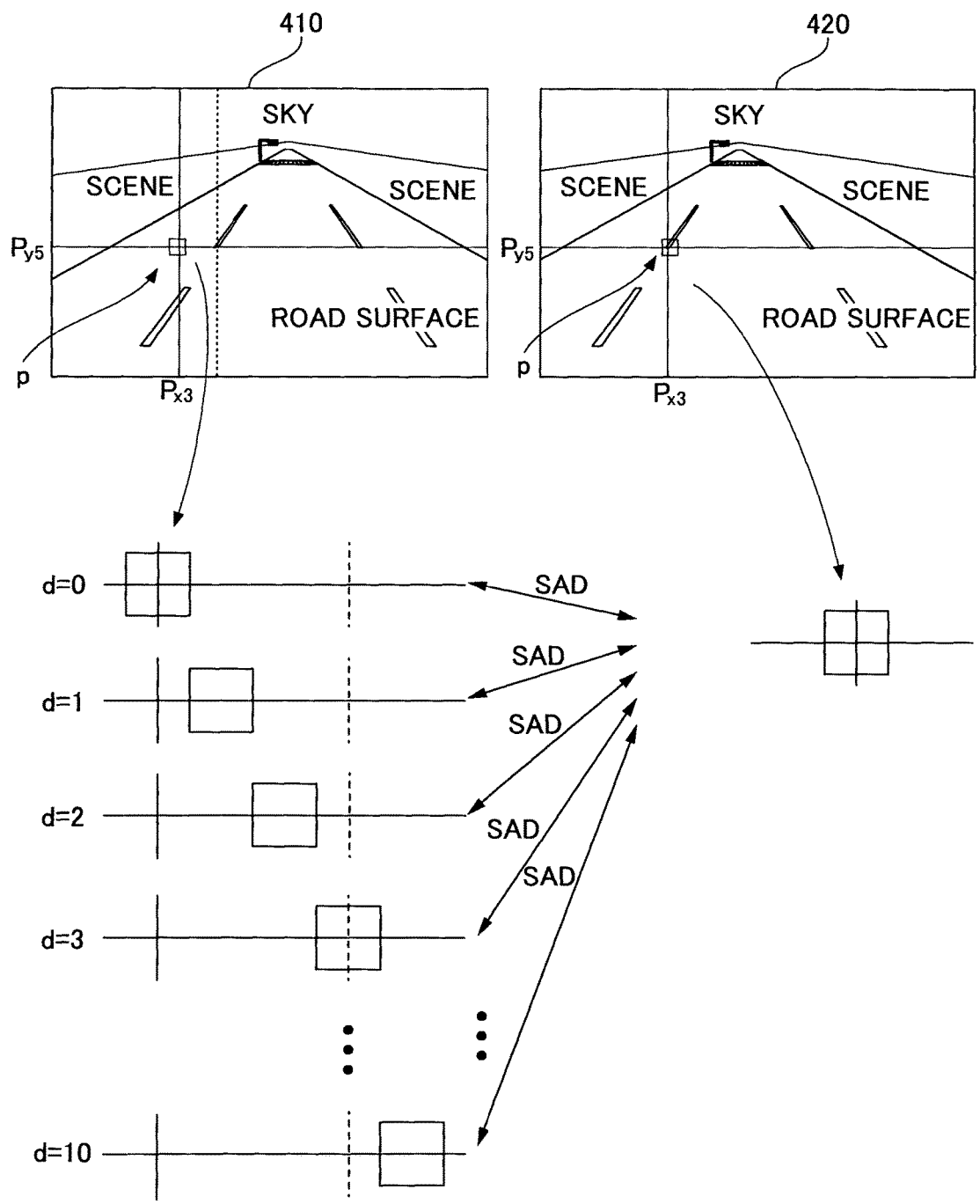
FIG. 8 is a diagram for explaining a cost computation process performed by a cost computation unit which constitutes a part of the stereo image operation module.

FIGS. 8 and 9 are diagrams for explaining the cost computation process performed by the cost computation unit 731. FIG. 8 shows an example in which the cost computation process computes an SAD as a cost of the noticed pixel $p=(P_{x3}, P_{y5})$ in the stereo images including the image 410 taken by the image pickup unit 710 and the image 420 taken by the image pickup unit 720.

As shown in FIG. 8, a shooting position of the image 410 differs from a shooting position of the image 420, and even if the noticed pixel $p=(P_{x3}, P_{y5})$ is read from the same position in the stereo images, the two pixels in the stereo images do not point to the same object but point to different positions which deviate from each other in the horizontal right/left direction.

Hence, a difference in the luminance value between the noticed pixel $p=(P_{x3}, P_{y5})$ in the image 420 and the noticed pixel $p=(P_{x3}, P_{y5})$ in the image 410, which is equivalent to the SAD in a case where the block size is 1×1 pixel, is comparatively large.

Here, the noticed pixel p in the image 410 (comparison image) is shifted rightward by one pixel, and a value of the SAD when the parallax d=1 is computed. Specifically, a value of the difference (SAD) between the luminance value of the noticed pixel $p=(P_{x3}, P_{y5})$ in the image 420 and the luminance value of the noticed pixel $p=(P_{x3+1}, P_{y5})$ in the image 410 is computed. In the example of FIG. 8, when the parallax d=1, the value of the SAD is comparatively large.

Similarly, the parallax is changed to d=2, 3, . . . , and a value of the corresponding SAD is computed accordingly. In the example of FIG. 8, when the parallax d=3, the object which the noticed pixel $p=(P_{x3+3}, P_{y5})$ in the image 410 points to becomes the same as the object which the noticed pixel $p=(P_{x3}, P_{y5})$ in the image 420 points to. For this reason, the value of the SAD when the parallax d=3 is smaller than the value of the SAD when the parallax d≠3.

Figure 10A:
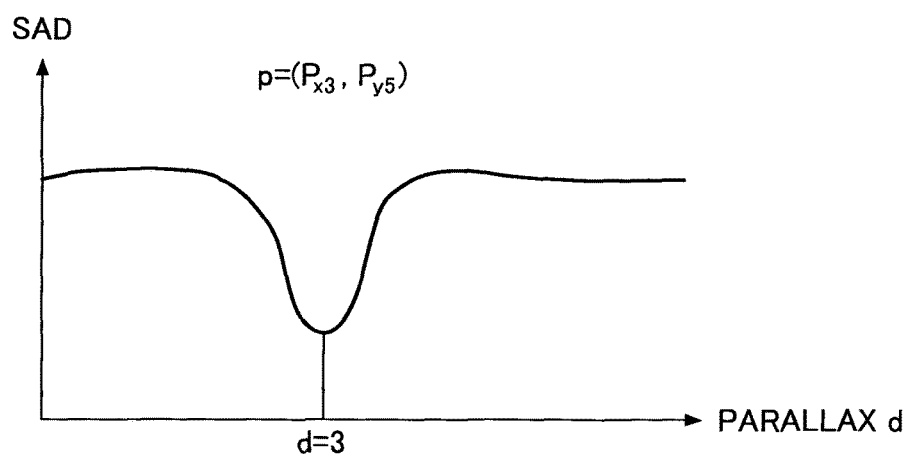
FIGS. 10A and 10B are diagrams for explaining a relationship between parallax of a predetermined pixel in a stereo image and SAD.

FIG. 10A shows a graph (the parallax-SAD graph) which shows changes of the SAD of the noticed pixel $p=(P_{x3}, P_{y5})$ to the parallax d when the horizontal axis denotes the parallax d and the vertical axis denotes the SAD. As shown in FIG. 10A, the value of the SAD of the noticed pixel $p=(P_{x3}, P_{y5})$ is the smallest when the parallax d=3, and it may be determined that the parallax d of the noticed pixel $p=(P_{x3}, P_{y5})$ is equal to 3.

On the other hand, FIG. 9 shows an example in which the cost computation process computes an SAD as a cost of the noticed pixel $p=(P_{x4}, P_{y6})$ in the stereo images including the image 410 taken by the image pickup unit 710 and the image 420 taken by the image pickup unit 720.

As shown in FIG. 9, a shooting position of the image 410 differs from a shooting position of the image 420, and even if the noticed pixel $p=(P_{x4}, P_{y6})$ is read from the same position in the stereo images, the two pixels in the stereo images do not point to the same object but point to different positions which deviate from each other in the horizontal right/left direction.

Hence, a difference in the luminance value between the noticed pixel $p=(P_{x4}, P_{y6})$ in the image 420 and the noticed pixel $p=(P_{x4}, P_{y6})$ in the image 410, which is equivalent to the SAD in a case where the block size is 1×1 pixel, is comparatively large.

Here, similarly to FIG. 8, the noticed pixel p in the image 410 (comparison image) is shifted rightward by one pixel, and a value of the SAD when the parallax d=1 is computed. Specifically, a value of the difference (SAD) between the luminance value of the noticed pixel $p=(P_{x4}, P_{y6})$ in the image 420 and the luminance value of the noticed pixel $p=(Px_{4+1}, P_{y6})$ in the image 410 is computed. In the example of FIG. 9, also when the parallax d=1, the value of the SAD is comparatively large.

Similarly, the parallax is changed to d=2, 3, . . . , and a value of the corresponding SAD is computed accordingly. In the example of FIG. 9, when the parallax d=3, the object which the noticed pixel $p=(P_{x4+3}, P_{y6})$ in the image 410 points to becomes the same as the object which the noticed pixel $p=(P_{x4}, P_{y6})$ in the image 420 points to. In the example of FIG. 9, however, the image portion corresponds to a road surface, and the corresponding pixels of the image portion originally have smooth texture. Hence, changes of the SAD of the corresponding pixels are also small.

Figure 10B:
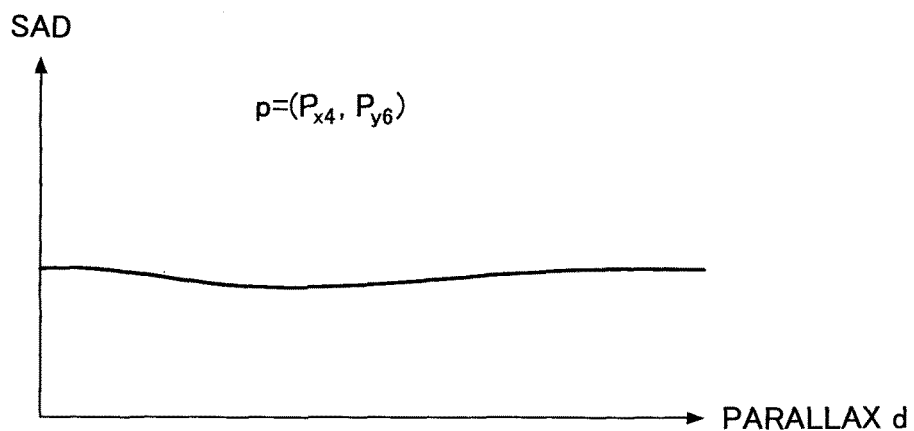

FIG. 10B shows a graph (the parallax-SAD graph) which shows changes of the SAD relative to the parallax d of the noticed pixel $p=(P_{x4}, P_{y6})$ in which the horizontal axis denotes the parallax d and the vertical axis denotes the SAD. As shown in FIG. 10B, the changes of the SAD of the noticed pixel $p=(P_{x4}, P_{y6})$ to the changes of the parallax d are small and the parallax may not be extracted.

Thus, the pixels whose parallaxes may not be determined by the cost computation process performed by the cost computation unit 731 are present, and the energy computation unit 732 of the parallax operation unit 730 is configured to perform an energy computation process in order to allow the parallax to be determined.

The energy computation unit 732 is configured to perform an energy computation process which computes propagation parameters $L_r$ by using a dense matching algorithm, and computes an energy value S(p, d) of the noticed pixel p using the computed propagation parameters $L_r$.

Figure 11:
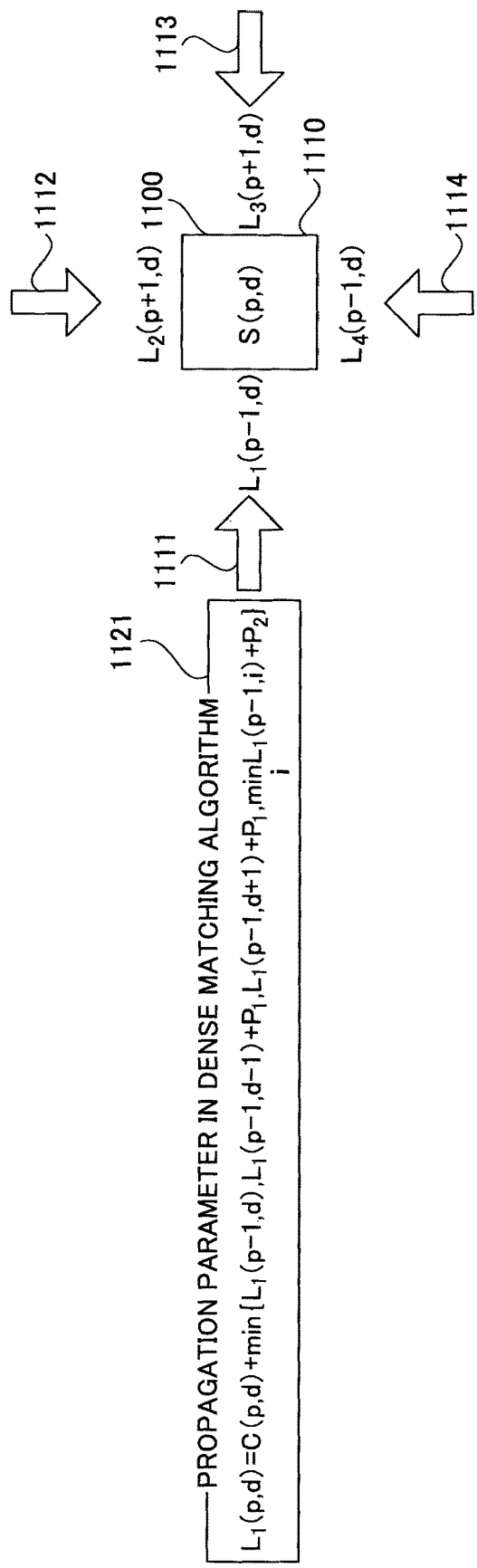
FIG. 11 is a diagram for explaining a process to compute propagation parameters by using a dense matching algorithm.

First, a process in the energy computation process which computes propagation parameters $L_r$ by using the dense matching algorithm is first explained. FIG. 11 is a diagram for explaining the process to compute the propagation parameters $L_r$ by using the dense matching algorithm.

Illustrated in FIG. 11 is a case in which propagation parameters $L_r$ in four directions of a pixel 1100 as the noticed pixel p are determined. Specifically, with respect to the pixel 1100 as the noticed pixel p, a propagation parameter $L_1$ in the arrow 1111 direction, a propagation parameter $L_2$ in the arrow 1112 direction, a propagation parameter $L_3$ in the arrow 1113 direction, and a propagation parameter $L_4$ in the arrow 1114 direction are determined. However, the directions (r) in which the propagation parameters are determined for the pixel 1100 are not limited to the four directions. For example, the directions (r) may be eight directions or two directions.

As shown in FIG. 11, the propagation parameter $L_1$ in the arrow 1111 direction may be determined in accordance with the following formula:

$$L_1(p, d) = C(p, d) + \min\{L_1(p-1, d), L_1(p-1, d-1) + P_1,$$
$$L_1(p-1, d+1) + P_1, \min_i L_1(p-1, i) + P_2\}$$

where p denotes the coordinates of the pixel 1100 and d denotes the parallax.

In this manner, the propagation parameter $L_1(p, d)$ may be computed using the cost C(p, d) of the pixel 1100 and the propagation parameters of an adjacent pixel on the left-hand side of the pixel 1100 and located apart from the pixel 1100 by one pixel with each of the parallax (d−1), the parallax d, and the parallax (d+1). Namely, the propagation parameters in the arrow 1111 direction are computed sequentially in the left-to-right direction. The propagation interval at which the propagation parameters are computed in the left-to-right direction is not limited to one pixel. Alternatively, the propagation parameter $L_1(p, d)$ may be computed using the propagation parameters of a nearby pixel on the left-hand side of the pixel 1100 and located apart from the pixel 1100 by "a" pixels ("a"≥2) with each of the parallax (d−1), the parallax d, and the parallax (d+1).

Similarly, the propagation parameter $L_2$ in the arrow 1112 direction is computed sequentially in the up-to-down direction, the propagation parameter $L_3$ in the arrow 1113 direction is computed sequentially in the right-to-left direction, and the propagation parameter $L_4$ in the arrow 1114 direction is computed sequentially in the down-to-up direction.

Next, a process in the energy computation process which computes an energy value S(p, d) of the noticed pixel p using the computed propagation parameters $L_r$.

As described above, the energy computation unit 732 is configured to compute an energy value S(p, d) of each pixel based on all the propagation parameters in the respective directions computed for the pixel in accordance with the following formula.

$$S(p, d) = \sum_r L_r(p, d)$$

In the example of FIG. 11, the energy value S(p, d) may be computed in accordance with the formula: $S(p, d)=L_1(p, d)+L_2(p, d)+L_3(p, d)+L_4(p, d)$.

Next, an example of the dense matching algorithm is explained and application of the dense matching algorithm to the distance data transmitted from the laser radar distance measurement module 110 is explained.

Figure 12:
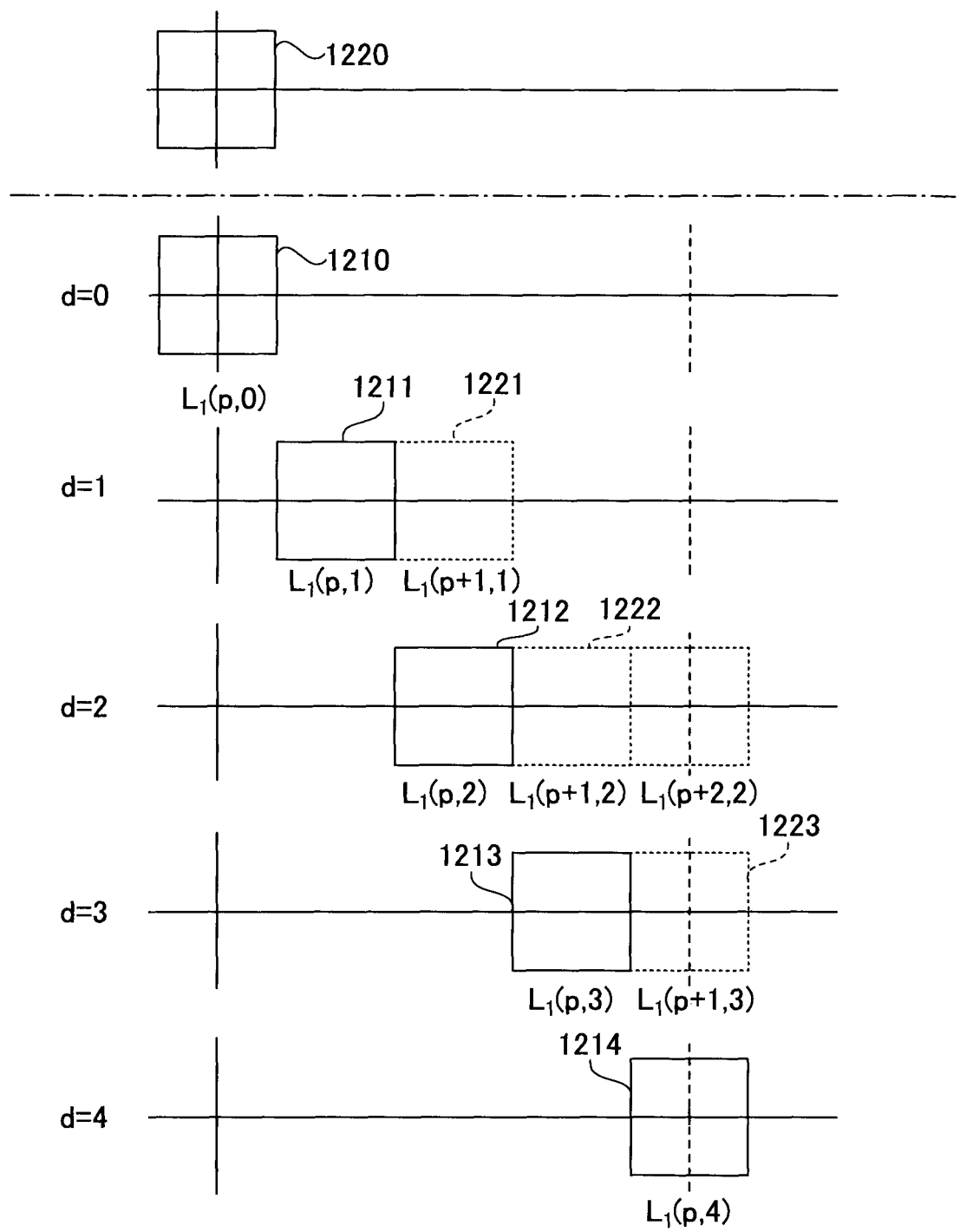
FIG. 12 is a diagram showing an example of the dense matching algorithm.

FIG. 12 is a diagram showing an example of the dense matching algorithm which determines a propagation parameter $L_1(p+1, d)$ from the propagation parameter $L_1(p, d)$. In FIG. 12, it is assumed that a pixel 1220 is the noticed pixel $p=(P_{x4}, P_{y6})$ in the image 420, a pixel 1210 is the noticed pixel $p=(P_{x4}, P_{y6})$ in the image 410, and pixels 1211-1214 are pixels when the parallax d of the pixel 1210 is equal to 1-4, respectively.

Here, it is assumed that the pixel 1220 in the image 420 is a pixel for which distance data to an object indicated by the pixel is measured by the laser radar distance measurement module 110 (and the distance data is correlated with the pixel 1220). When the distance to the object indicated by the pixel 1220 is measured, a parallax of the pixel in the image 410 corresponding to the pixel 1220 may be computed using the known distance between the image pickup unit 710 and the image pickup unit 720.

In the example of FIG. 12, it is assumed that the parallax d of the pixel 1210 in the image 410 corresponding to the pixel 1220 with which the distance data is correlated is equal to 4 (d=4). Namely, it is assumed that the position indicated by the pixel 1214 in the image 410 is the same as the position indicated by the pixel in the image 420 with which the distance data is correlated.

In this case, the luminance value of the pixel 1220 in the image 420 and the luminance value of the pixel 1214 in the image 410 are the same, and the propagation parameter $L_1(p, 4)$ of the pixel 1214 is equal to 0.

When the propagation parameter $L_1(p, 4)$ of the pixel 1214 is equal to 0, a propagation parameter $L_1(p, 3)$ of the pixel 1213 is set to C(p, 3)+0. That is, the propagation parameter $L_1(p, 3)$ of the pixel 1213 may be computed based on a difference value between the luminance value of the pixel 1213 and the luminance value of the pixel 1220.

Similarly, a propagation parameter $L_1(p, 2)$ of the pixel 1212 is set to C(p, 2)+0, and the propagation parameter $L_1(p, 2)$ of the pixel 1212 may be computed based on a difference value between the luminance value of the pixel 1212 and the luminance value of the pixel 1220.

Similarly, a propagation parameter $L_1(p, 1)$ of the pixel 1211 and a propagation parameter $L_1(p, 0)$ of the pixel 1210 may also be computed based on a difference value between the luminance value of the pixel 1211 and the luminance value of the pixel 1220, and a difference value between the luminance value of the pixel 1210 and the luminance value of the pixel 1220. Namely, based on the similarity between the pixels in the image 410 and the corresponding pixels in the image 420, the propagation parameters $L_1(p, 0)-L_1(p, 4)$ of the pixels 1210-1214 in the image 410 may be computed.

After the propagation parameters $L_1(p, 0)-L_1(p, 4)$ of the pixels 1210-1214 in the image 410 are computed, a propagation parameter $L_1(p+1, d)$ of the pixel 1223 may be computed.

Specifically, the propagation parameter $L_1(p+1, 3)$ is computed in accordance with the formula $L_1(p+1, 3)=C(p+1, 3)+\min\{L_1(p, 3), L_1(p, 2)+P_1, L_1(p, 4)+P_1\}$. In this formula, $P_1$ is a constant and $L_1(p, 4)=0$, and as described above, $L_1(p, 3)$ is equal to C(p, 3) and $L_1(p, 2)$ is equal to C(p, 2).

By repeating the same process, the propagation parameters of the pixels 1222, 1221, . . . , may be determined, and thus the propagation parameters of all the pixels in the image 410 may be computed.

Hence, the energy computation unit 732 is configured to compute the parallax d of the pixel in the image 410 (the comparison image) corresponding to the pixel in the image 420 (the reference image) with which the distance data is correlated is computed, based on the distance data received from the laser radar distance measurement module 110. Further, by assuming that the propagation parameter $L_1(p, d)$ for the parallax d of the pixel corresponding to the pixel with which the distance data is correlated is equal to 0, the energy computation unit 732 is configured to compute the propagation parameters of pixels other than the corresponding pixel sequentially by using the propagation parameter $L_1(p, d)$ as a starting point.

In this manner, the energy computation unit 732 uses the pixel in the comparison image corresponding to the pixel in the reference image, with which the distance measured by the laser radar distance measurement module 110 is correlated, as the starting point when computing the propagation parameters of other pixels. By assuming that the propagation parameter for the parallax d of the corresponding pixel is equal to 0, the accuracy of the propagation parameters of other pixels which are computed sequentially using the propagation parameter for the parallax d of the corresponding pixel as the starting point may be increased. Hence, the accuracy of parallax computation may be increased.

Figure 13:
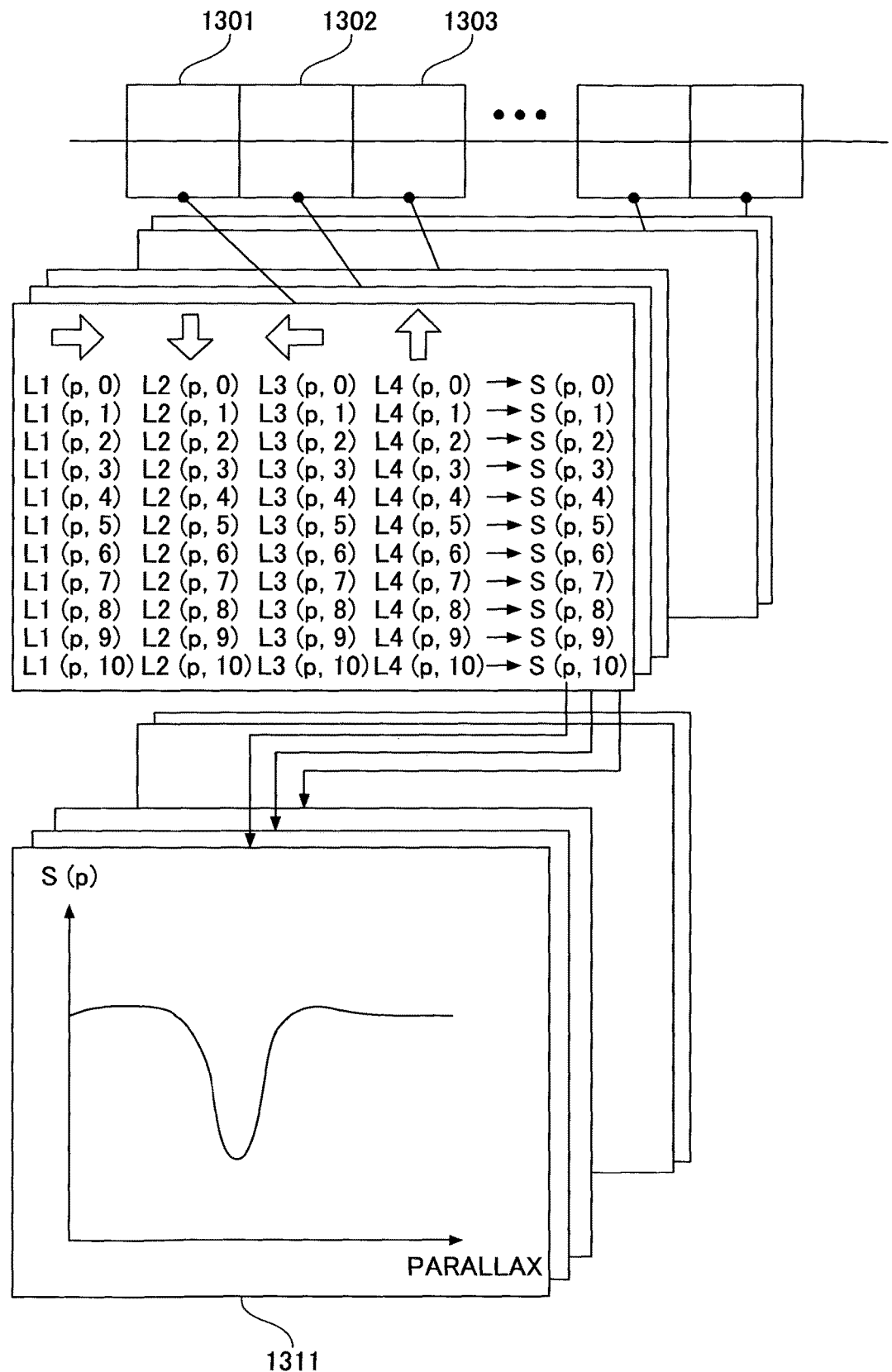
FIG. 13 is a diagram for explaining a relationship between an energy value computed by an energy computation unit and parallax.

Next, a relationship between the energy value S(p, d) computed by the energy computation unit 732 and the parallax is explained. FIG. 13 is a diagram for explaining the relationship between the energy value computed by the energy computation unit 732 and the parallax.

In the example shown in FIG. 13, the propagation parameters $L_1$ to $L_4$ of the pixel 1301 in the four directions are computed for the parallax d which is varied in the range of the parallax d=0 to 10, respectively. The energy values S(p, 0)-S(p, 10) for the respective parallaxes are computed by summing the propagation parameters $L_1$-$L_4$ in the four directions for a corresponding one of the parallaxes.

In a parallax-energy graph 1311 indicated at the lower portion of FIG. 13, the horizontal axis denotes the parallax d, the vertical axis denotes the energy value S(p), and the energy values S(p, 0)-S(p, 10) computed for the pixel 1301 are plotted. As shown in the parallax-energy graph 1311, the energy value S(p) falls steeply at a certain value of the parallax d.

As is apparent from the foregoing explanation, in this embodiment, the energy value S(p) is computed for an image portion with smooth texture, such as a road surface, and changes of the energy value S(p) according to changes of the parallax d may be great enough to increase the accuracy of parallax computation. On the other hand, in the related art, the SAD is computed for an image portion with smooth texture, such as a road surface, and changes of the SAD according to changes of the parallax d have been too small to increase the accuracy of parallax computation. Hence, it is possible according to this embodiment to compute the parallaxes with sufficient accuracy.

The same process may be performed also for other pixels 1302, 1303, . . . , and the parallaxes of the other pixels may be computed with sufficient accuracy by computing the energy values S(p).

Figure 14:
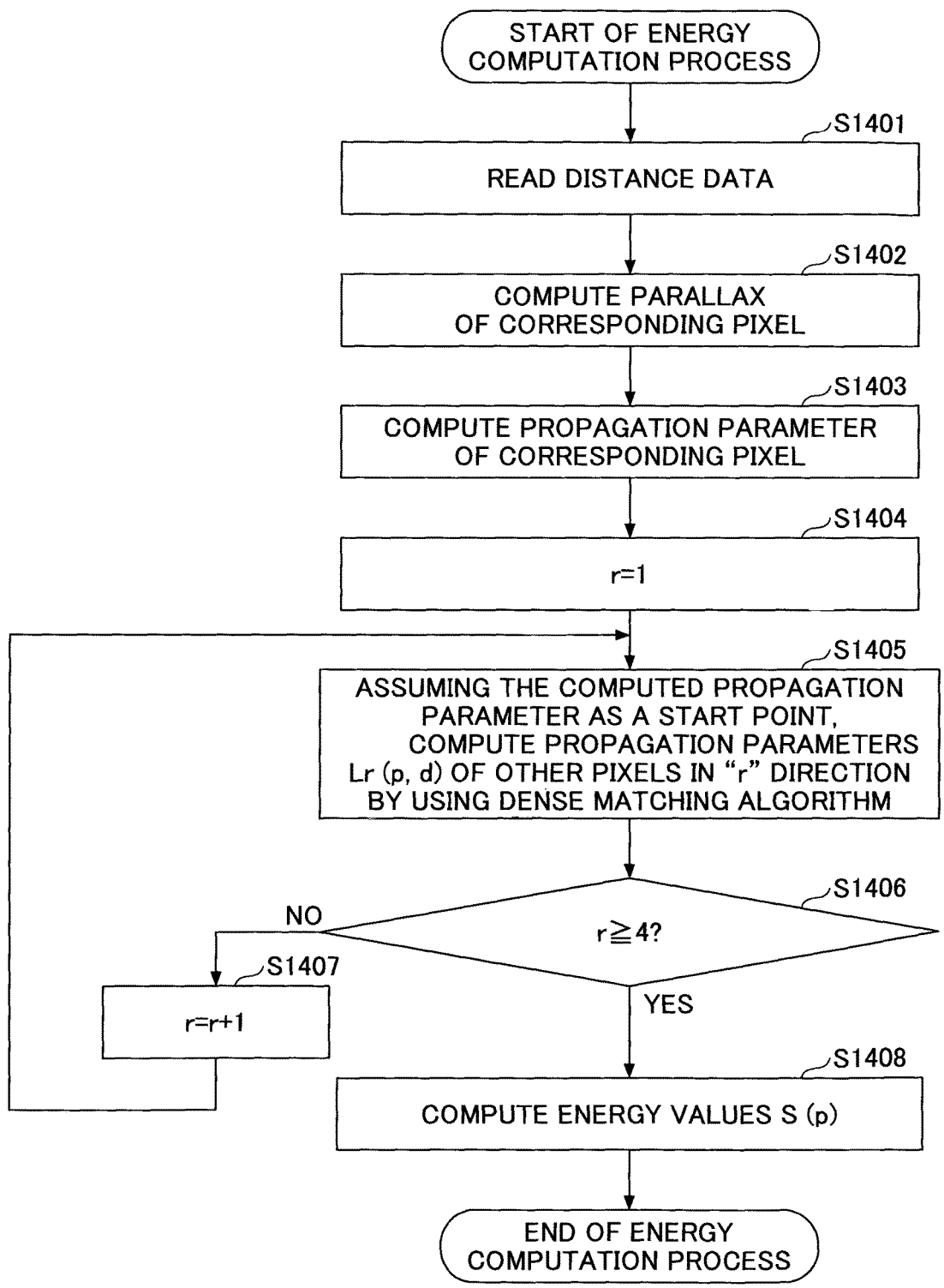
FIG. 14 is a flowchart for explaining an energy computation process performed by the energy computation unit.

Next, a flow of the energy computation process performed by the energy computation unit 732 is explained. FIG. 14 is a flowchart for explaining the energy computation process performed by the energy computation unit 732.

Following the end of the cost computation process by the cost computation unit 731, the energy computation unit 732 starts performing the energy computation process shown in FIG. 14. It should be noted that the energy computation process shown in FIG. 14 is performed repeatedly on a frame-by-frame basis for each of frames of stereo images, and, in the example of FIG. 14, the energy computation process is performed on one frame of the stereo images.

As shown in FIG. 14, at step S1401, the energy computation unit 732 reads the distance data corresponding to one of multiple frames of the stereo image to be processed from the laser radar distance measurement module 110.

At step S1402, the energy computation unit 732 identifies a pixel among the pixels in the reference image of the frame to be processed with which the distance data is correlated. Furthermore, at step S1402, the energy computation unit 732 computes a parallax d of a pixel in the comparison image corresponding to the identified pixel in the reference image, based on the distance data and the known distance between the image pickup units 710 and 720.

At step S1403, the energy computation unit 732 computes a propagation parameter for the parallax d of the pixel in the comparison image corresponding to the pixel with which the distance data is correlated.

At step S1404, a counter r is set to 1 (the counter r=1 denotes a propagation parameter in the direction indicated by the arrow 1111 in FIG. 11 among the propagation parameters in the four directions).

At step S1405, the energy computation unit 732 computes propagation parameters $L_1$(p, d) of all other pixels in the "r" direction by using the dense matching algorithm, assuming that the propagation parameter computed at step S1403 is the starting point.

At step S1406, the energy computation unit 732 determines whether the counter r is equal to or greater than 4 (r≥4). When the counter r is less than 4 (r<4), the process progresses to step S1407 at which the counter r is incremented (r=r+1), and returns to step S1405. At step S1405, the energy computation unit 732 computes propagation parameters $L_2$(p, d) of the other pixels by using the dense matching algorithm, assuming that the propagation parameter computed at step S1403 is the starting point.

Similarly, the propagation parameters $L_3$(p, d) and $L_4$(p, d) are computed by the energy computation unit 732. When it is determined at step S1406 that the computation of the propagation parameters in the four directions is completed (r≥4), the process progresses to step S1408.

At step S1408, the energy computation unit 732 computes energy values S(p) of each pixel for the respective parallaxes by summing the propagation parameters $L_1$(p, d)-$L_4$(p, d) in the four directions for a corresponding one of the parallaxes. Subsequently, the energy computation unit 732 generates a parallax-energy graph as shown in FIG. 13 based on the computed energy values S(p).

Figure 15:
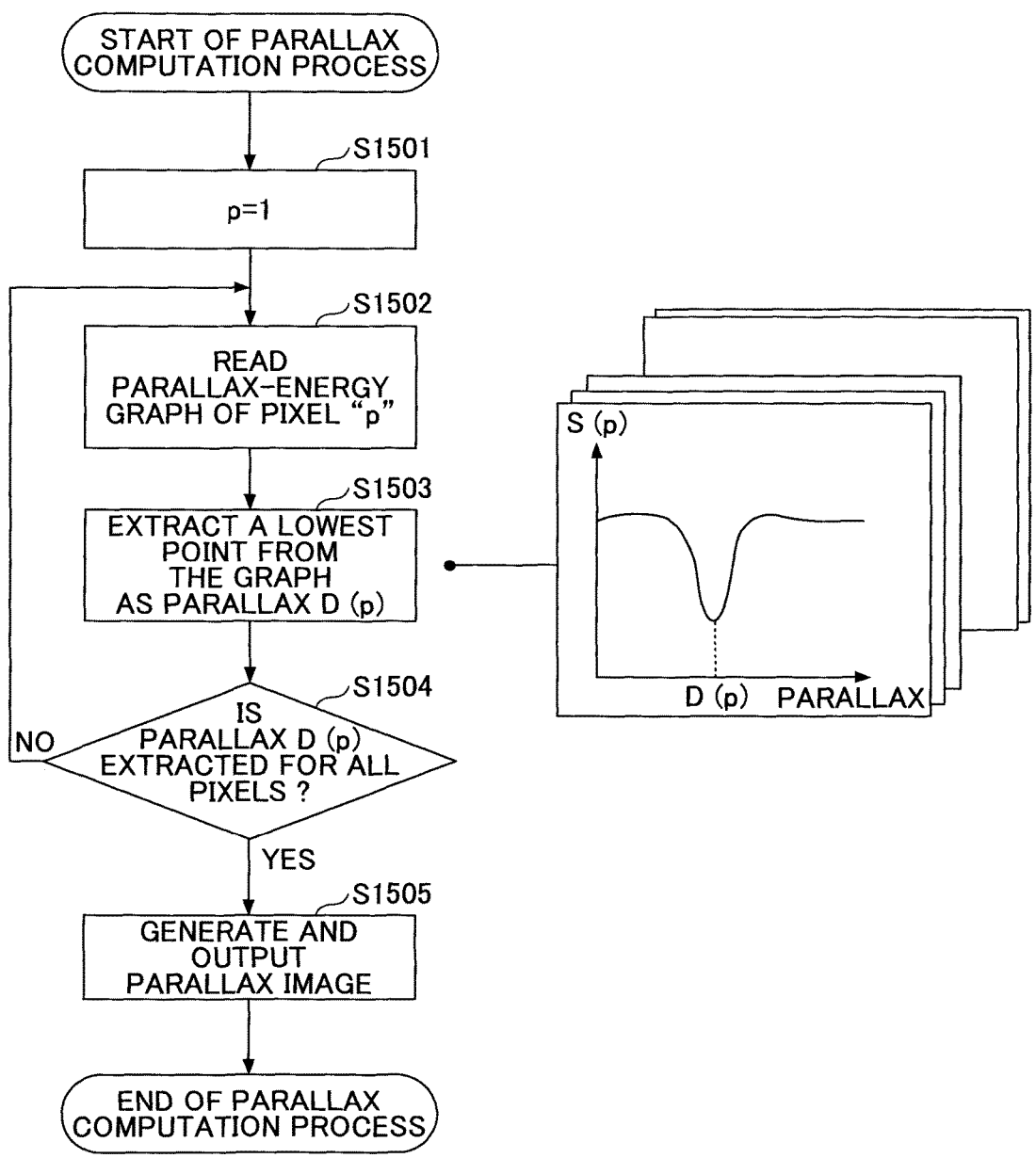
FIG. 15 is a flowchart for explaining a parallax computation process performed by a parallax computation unit.

Next, the parallax computation unit 733 is explained. FIG. 15 is a flowchart for explaining a parallax computation process performed by the parallax computation unit 733.

Following the end of the energy computation process by the energy computation unit 732, the parallax computation unit 733 starts performing the parallax computation process shown in FIG. 15. It should be noted that the parallax computation process shown in FIG. 15 is performed repeatedly on a frame-by-frame basis for each of frames of stereo images, and, in the example of FIG. 15, the parallax computation process is performed on a comparison image included in one frame of the stereo images.

As shown in FIG. 15, at step S1501, a pixel counter p is set to 1. At step S1502, the parallax-energy graph of the noticed pixel p (indicated by the pixel counter p) in the comparison image is read. As described above, the parallax-energy graph of each of the pixels in the comparison image is computed by the energy computation unit 732, and the parallax-energy graph of the noticed pixel p among those parallax-energy graphs is read at step S1502.

At step S1503, the parallax computation unit 733 computes the lowest point in the read parallax-energy graph, which is below a predetermined threshold, and extracts the lowest point from the read parallax-energy graph as a parallax D(p). At step S1504, the parallax computation unit 733 determines whether the parallax D(p) is extracted for all the pixels in the frame to be processed.

When it is determined at step S1504 that there is a pixel for which the parallax D(p) is not extracted, the process returns to step S1502.

On the other hand, when it is determined at step S1504 that the parallax D(p) is extracted for all the pixels in the frame to be processed, the parallax computation unit 733 at step S1505 generates and outputs a parallax image of the frame to be processed based on the extracted parallaxes D(p).

As described in the foregoing, the parallax operation system 100 according to this embodiment includes the laser radar distance measurement module 110 which measures the distance by using a laser beam, and the stereo image operation module 120 which computes the parallax image. These modules of the parallax operation system 100 are configured as follows.

The laser radar distance measurement module 110 is configured to synchronize with the stereo images taken by the image pickup units 710 and 720 which constitute the stereo cameras, so that the distance for the predetermined emission range may be measured.

The stereo image operation module 120 is configured to correlate the distance data read from the laser radar distance measurement module 110 with pixels in the frame of a corresponding stereo image (reference image).

The stereo image operation module 120 is configured to compute parallaxes of pixels in the comparison image corresponding to the pixels in the reference image with which the distance data is correlated, based on the distance data and the known distance between the stereo cameras.

The stereo image operation module 120 is configured to compute propagation parameters of other pixels in the frame sequentially through the dense matching algorithm by using as the starting point the propagation parameter for the parallax d of the pixel in the comparison image corresponding to the pixel in the reference image with which the distance data is correlated.

In this manner, by using the propagation parameter for the parallax d of the pixel in the comparison image, corresponding to the pixel in the reference image with which the distance measured by the laser radar distance measurement module 110 is correlated, as the starting point when computing propagation parameters of other pixels, the parallax operation system 100 according to this embodiment may determine the propagation parameters of the other pixels with good accuracy. Hence, it is possible for the parallax operation system 100 according to this embodiment to increase the accuracy of the propagation parameters of the other pixels which are computed sequentially by using the propagation parameter for the parallax d of the pixel in the comparison image as the starting point. Consequently, it is possible for the parallax operation system 100 according to this embodiment to increase the accuracy of parallax computation.

Second Embodiment

In the above first embodiment, the case in which the distance measured by the laser radar distance measurement module 110 is used by the energy computation unit 732 has been described. However, the present invention is not limited to this embodiment. For example, the distance measured by the laser radar distance measurement module 110 may be used by the parallax computation unit 733 when performing the parallax computation process.

Next, a parallax operation system 100 according to a second embodiment is explained. In the following, only differences of the parallax operation system 100 according to the second embodiment from the parallax operation system 100 according to the first embodiment will be explained.

Figure 16:
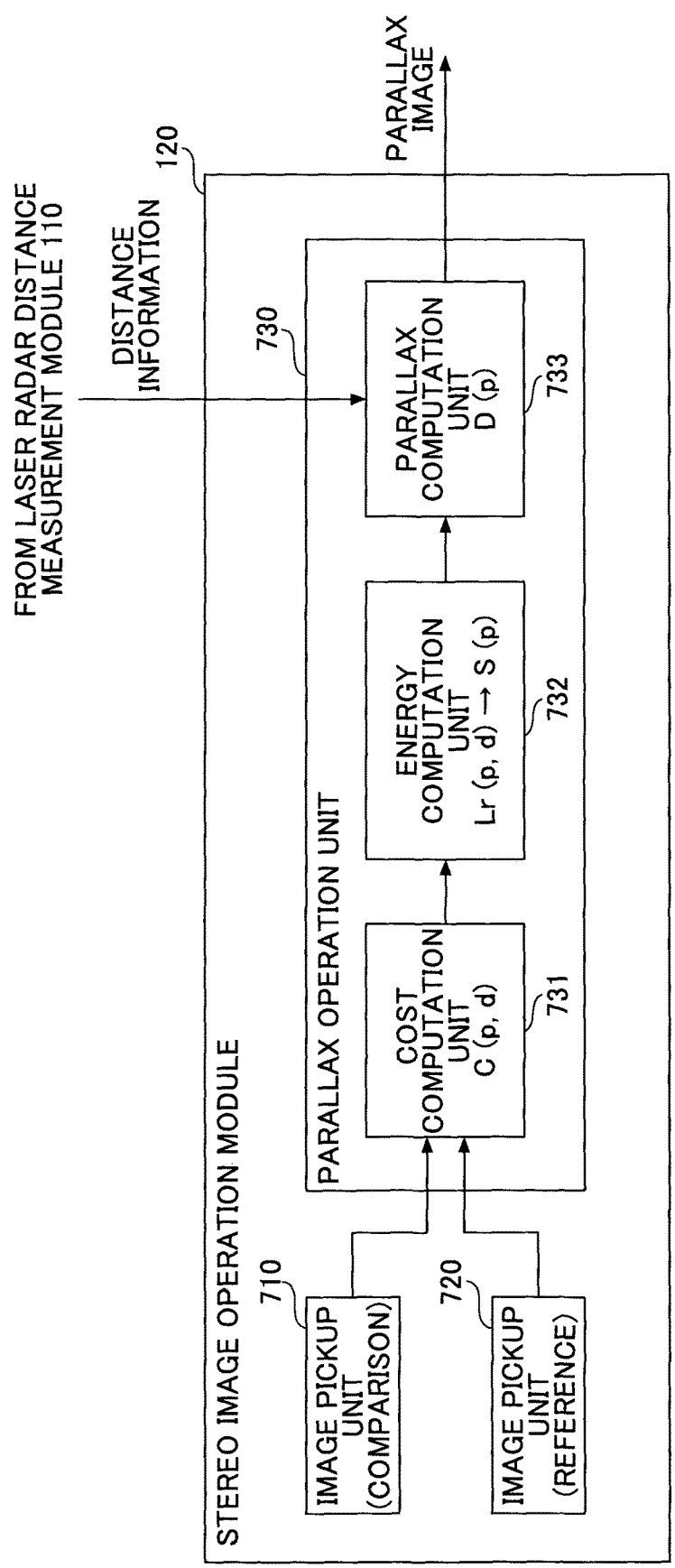
FIG. 16 is a diagram showing another functional configuration of the stereo image operation module.

A functional configuration of the stereo image operation module 120 in the parallax operation system 100 according to this embodiment is explained. FIG. 16 is a block diagram showing a functional configuration of the stereo image operation module 120 in the parallax operation system 100 according to this embodiment.

The stereo image operation module 120 according to this embodiment shown in FIG. 16 differs from the first embodiment shown in FIG. 7 in that the distance information transmitted from the laser radar distance measurement module 110 is input to the parallax computation unit 733. In the parallax operation system 100 according to this embodiment, the laser radar distance measurement module 110 includes a turning-direction scan mirror (not shown) and is configured to change an emission direction of the laser beams relative to the forward direction of the vehicle around the turning direction by using the turning-direction scan mirror when the stereo images are taken by the image pickup units 710 and 720. For example, the laser beams may be emitted at three different emission angles to the forward direction of the vehicle around the turning direction. Hence, two or more distance information items corresponding to the several emission directions are included in the distance information received from the laser radar distance measurement module 110.

Figure 17:
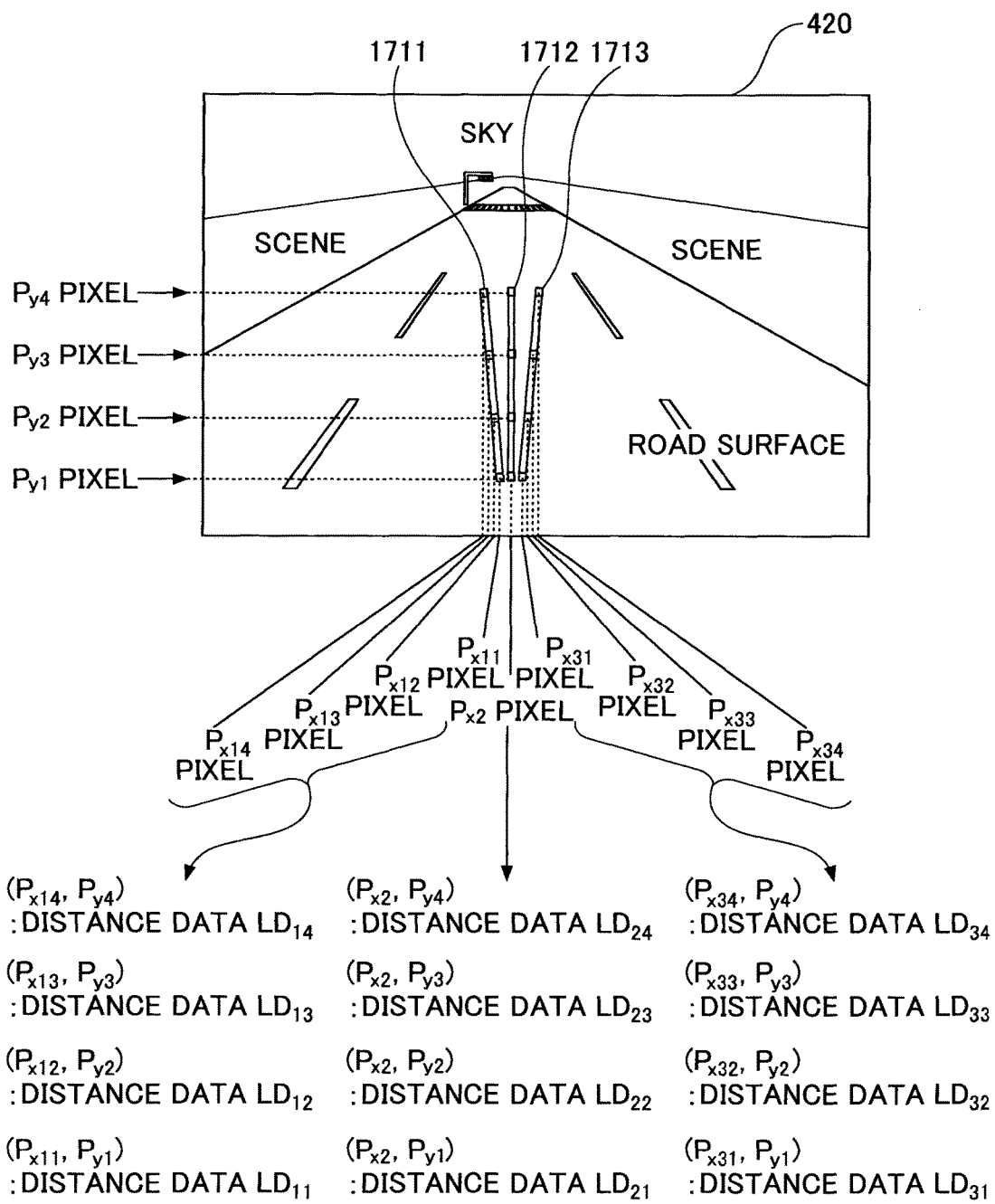
FIG. 17 is a diagram for explaining a relationship between an emission position of a laser beam and a pixel position of a stereo image.

A relationship between an emission position of laser beam and a pixel position of stereo images used by the parallax operation system 100 according to this embodiment is explained. FIG. 17 is a diagram for explaining the relationship between the emission position of a laser beam and the pixel position of stereo images in the parallax operation system 100 according to this embodiment. In the parallax operation system 100 according to this embodiment, the laser radar distance measurement module 110 is mounted between the stereo cameras of the stereo image operation module 120, so that the laser radar distance measurement module 110 is rotatable in the turning direction and emits laser beams in a predetermined emission range in the elevation-angle direction.

Hence, as shown in FIG. 17, the pixels at predetermined positions in the image 420 for the several emission angles correspond to the emission positions of laser beams. In FIG. 17, reference numbers 1711-1713 denote the emission ranges of laser beams in the image 420.

Specifically, as shown in FIG. 17, the pixel of $(P_{x11}, P_{y1})$, the pixel of $(P_{x12}, P_{y2})$, the pixel of $(P_{x13}, P_{y3})$, and the pixel of $(P_{x14}, P_{y4})$ correspond to the positions where distances for the emission range 1711 are measured. Hence, these pixels are correlated with the distances measured by the laser radar distance measurement module 110.

In the example of the image 420, distance data $LD_{11}$ is correlated with the pixel of $(P_{x11}, P_{y1})$, distance data $LD_{12}$ is correlated with the pixel of $(P_{x12}, P_{y2})$, distance data $LD_{13}$ is correlated with the pixel of $(P_{x13}, P_{y3})$, and distance data $LD_{14}$ is correlated with the pixel of $(P_{x14}, P_{y4})$.

Similarly, the pixel of $(P_{x2}, P_{y1})$, the pixel of $(P_{x2}, P_{y2})$, the pixel of $(P_{x1}, P_{y3})$, and the pixel of $(P_{x1}, P_{y4})$ correspond to the positions where distances for the emission range 1712 are measured. Hence, distance data $LD_{21}$ is correlated with the pixel of $(P_{x2}, P_{y1})$, distance data $LD_{22}$ is correlated with the pixel of $(P_{x2}, P_{y2})$, distance data $LD_{23}$ is correlated with the pixel of $(P_{x2}, P_{y3})$, and distance data $LD_{24}$ is correlated with the pixel of $(P_{x2}, P_{y4})$.

Similarly, the pixel of $(P_{x31}, P_{y1})$, the pixel of $(P_{x32}, P_2)$, the pixel of $(P_{x33}, P_{y3})$, and the pixel of $(P_{x34}, P_{y4})$ correspond to the positions where distances for the emission range 1713 are measured. Hence, distance data $LD_{31}$ is correlated with the pixel of $(P_{x31}, P_{y1})$, distance data $LD_{32}$ is correlated with the pixel of $(P_{x32}, P_{y2})$, distance data $LD_{33}$ is correlated with the pixel of $(P_{x33}, P_{y3})$, and distance data $LD_{34}$ is correlated with the pixel of $(P_{x34}, P_{y4})$.

Because the distance between the image pickup unit 710 and the image pickup unit 720 which constitute the stereo cameras is known, the parallaxes of these pixels with which the distance data is correlated may be computed correctly based on the distance data $LD_{11}$-$LD_{34}$, respectively.

Figure 18:
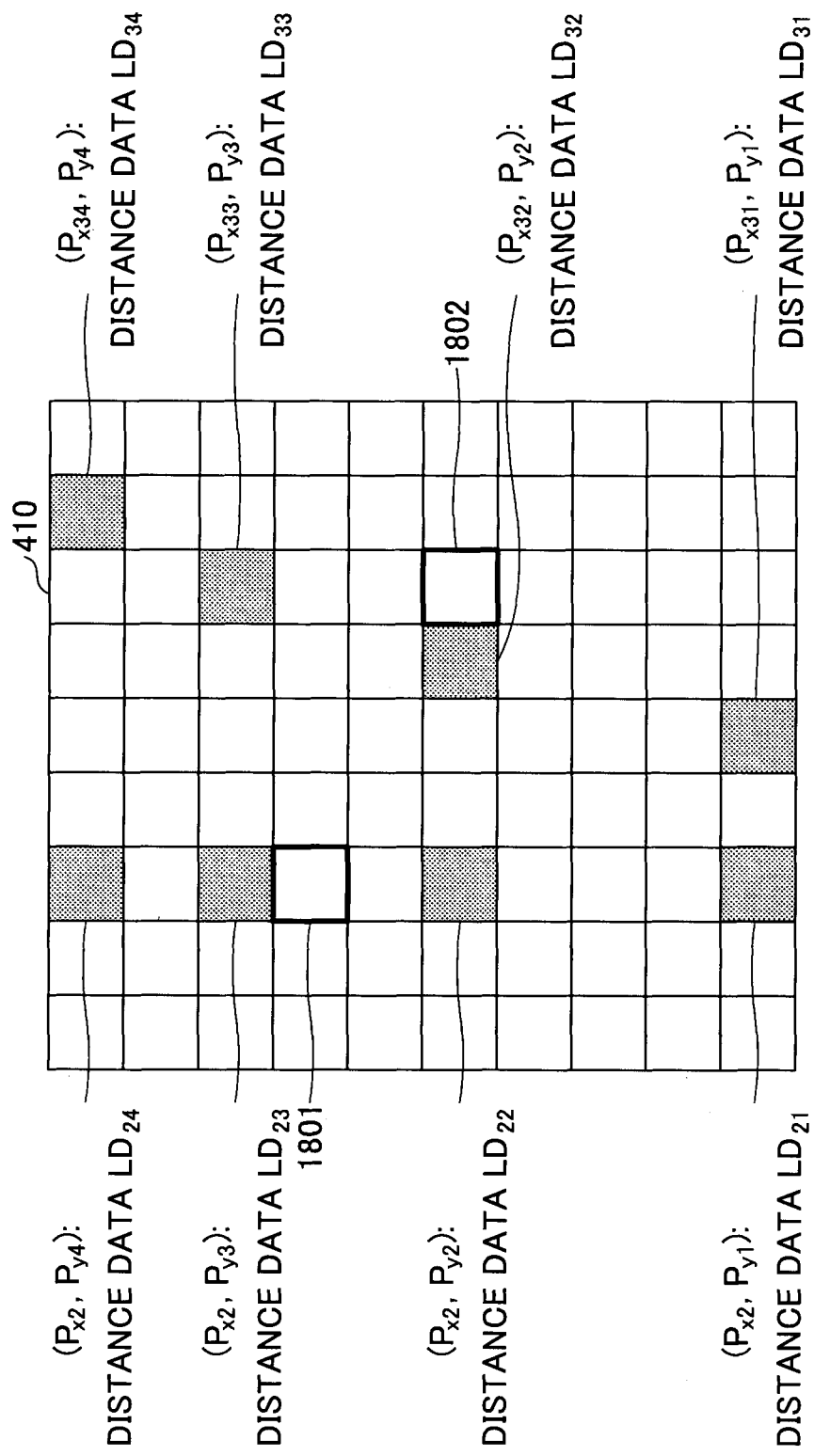
FIG. 18 is a diagram for explaining a parallax computation process performed by a parallax computation unit which constitutes a part of the stereo image operation module.

Next, a parallax computation process performed by the parallax computation unit 733 is explained. FIG. 18 is a diagram for explaining the parallax computation process performed by the parallax computation unit 733. Specifically, FIG. 18 shows an image portion of the image 410 (comparison image) which includes pixels corresponding to the pixels in the image 420 (reference image) with which the distance data is correlated. In FIG. 18, it is assumed that the shaded pixels are pixels in the image 410 corresponding to the pixels in the image 420 with which the distance data is correlated. In other words, the shaded pixels in FIG. 18 are pixels whose parallaxes have been computed based on the distance data.

Furthermore, it is assumed that a pixel 1801 and a pixel 1802 are pixels whose parallaxes have not been extracted by the energy computation unit 732. Specifically, it is assumed that the energy values S(p) of these pixels computed by the energy computation unit 732 do not show great changes to the parallax changes and a lowest point in the parallax-energy graph which is below the predetermined threshold is not found.

The parallax computation unit 733 is configured to interpolate parallaxes of these pixels 1801 and 1802 using the parallaxes already computed based on the distance data. In other words, the parallaxes of pixels other than the pixels whose parallaxes are already computed based on the distance data are interpolated using the computed parallaxes of the corresponding pixels.

For example, the pixel 1801 is located between the pixel ($P_{x2}$, $P_{y3}$) and the pixel ($P_{x2}$, $P_{y2}$) whose parallaxes are computed, lies one pixel apart from the pixel ($P_{x2}$, $P_{y3}$), and lies two pixels apart from the pixel ($P_{x2}$, $P_{y2}$). Here, it is assumed that $d_{23}$ denotes a parallax of the pixel ($P_{x2}$, $P_{y3}$) computed based on the distance data $LD_{23}$, and $d_{22}$ denotes a parallax of the pixel ($P_{x2}$, $P_{y2}$) computed based on the distance data $LD_{22}$. In this case, the parallax computation unit 733 computes a parallax of the pixel 1801 by the formula: the parallax of the pixel $\mathbf{1801} = d_{23} \times 2/3 + d_{22} \times 1/3$.

Moreover, the pixel 1802 is located adjacent to the pixel ($P_{x32}$, $P_{y2}$) and the pixel ($P_{x33}$, $P_{y3}$) whose parallaxes are computed. Here, it is assumed that $d_{32}$ denotes a parallax of the pixel ($P_{x32}$, $P_{y2}$) computed based on the distance data $D_{32}$, and $d_{33}$ denotes a parallax of the pixel ($Px_{33}$, $P_{y3}$) computed based on the distance data $D_{33}$. In this case, the parallax computation unit 733 computes a parallax of the pixel 1802 by the formula: the parallax of the pixel $\mathbf{1802} = d_{32} \times 3/4 + d_{33} \times 1/4$.

In this manner, the parallax computation unit 733 computes parallaxes of pixels which have not been computed by the energy computation unit 732, by using parallaxes of nearby pixels which have been computed based on the distance data. Moreover, when using the nearby pixels whose parallaxes are computed based on the distance data, a weighted parallax computation according to the distance between the nearby pixel and the pixel whose parallel has not been computed by the energy computation unit 732 is performed.

This enables the computation of the parallaxes of all the pixels in the frame of the image 410. Hence, it is possible to increase the accuracy of parallax computation.

Figure 19:
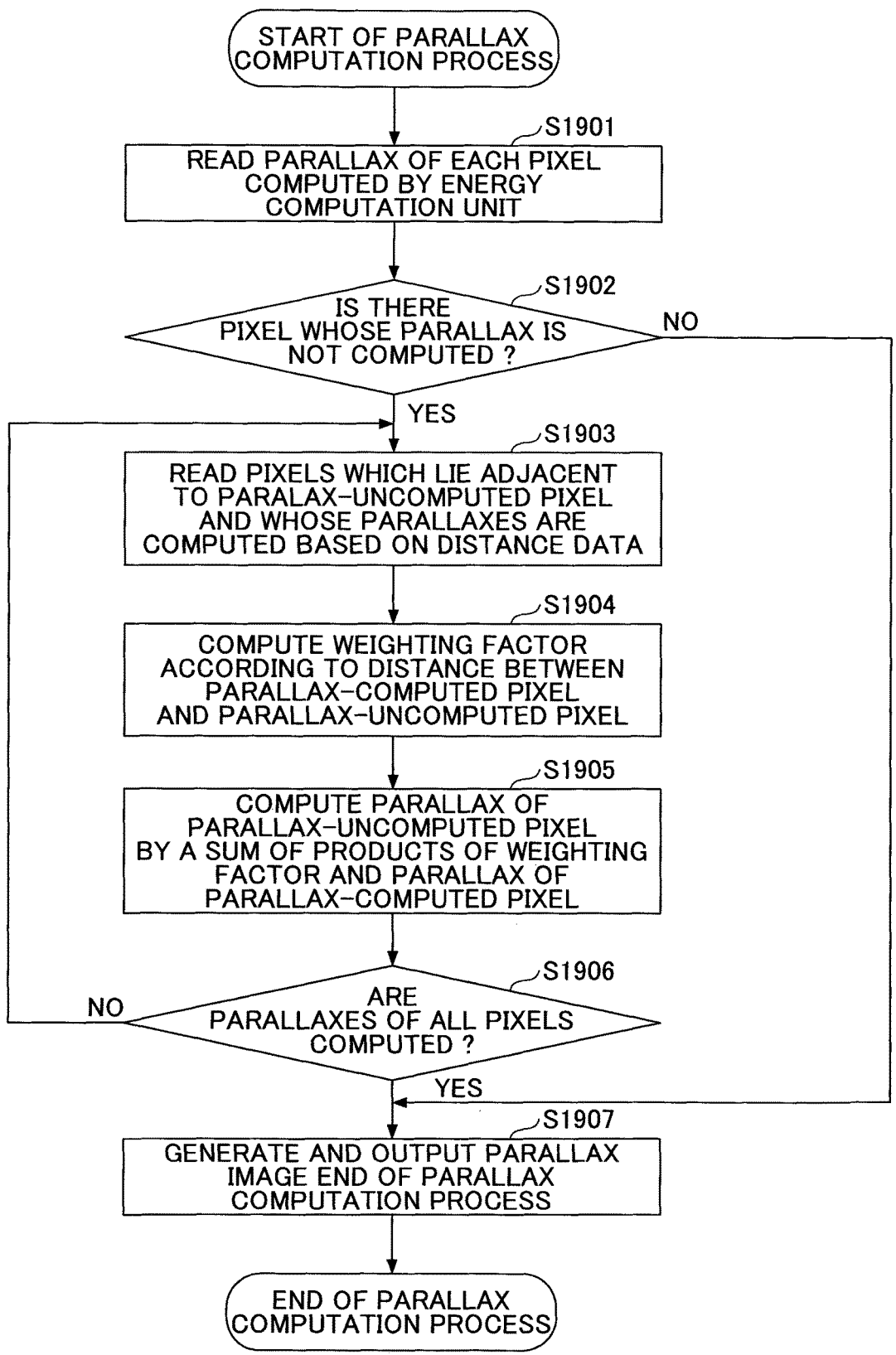
FIG. 19 is a flowchart for explaining a parallax computation process performed by the parallax computation unit.

Next, a flow of the parallax computation by the parallax computation unit 733 is explained. FIG. 19 is a flowchart for explaining the parallax computation process performed by the parallax computation unit 733.

Similar to the above-described first embodiment, following the end of the energy computation process by the energy computation unit 732, the parallax computation unit 733 starts performing the parallax computation process shown in FIG. 19. It should be noted that the parallax computation process shown in FIG. 19 is performed repeatedly on a frame-by-frame basis for each of frames of stereo images, and, in the example of FIG. 19, the parallax computation process is performed on one frame of the stereo images.

As shown in FIG. 19, at step S1901, the parallax computation unit 733 reads the parallax of each of pixels in the comparison image computed by the energy computation unit 732.

At step S1902, the parallax computation unit 733 determines whether there is a pixel whose parallax has not been computed among the pixels whose parallaxes are read at step S1901. When it is determined at step S1902 that there is no pixel whose parallax has not been computed, the process progresses to step S1907.

On the other hand, when it is determined at step S1902 that there is a pixel whose parallax has not been computed, the process progresses to step S1903. At step S1903, the parallax computation unit 733 reads nearby pixels which lie in a vicinity of the parallax-uncomputed pixel and whose parallaxes are already computed based on the distance data.

Subsequently, at step S1904, the parallax computation unit 733 computes a weighting factor of each of the nearby pixels according to a distance between the parallax-computed nearby pixel and the parallax-uncomputed pixel. At step S1905, the parallax computation unit 733 computes a parallax of the pixel whose parallax is not computed by the energy computation unit 732 by a sum of products of the parallaxes of the nearby pixels read at step S1903 and the weighting factors computed at step S1904.

At step S1906, the parallax computation unit 733 determines whether parallaxes of all the pixels in the frame to be processed are computed. When it is determined at step S1906 that there is a pixel whose parallax is not computed, the process returns to step S1903.

On the other hand, when it is determined at step S1906 that the parallaxes of all the pixels in the frame to be processed are computed, the process progresses to step S1907. At step S1907, the parallax computation unit 733 generates and outputs a parallax image based on the computed parallaxes of all the pixels in the frame to be processed.

As described in the foregoing, the parallax operation system 100 according to this embodiment includes the laser radar distance measurement module 110 which measures the distance by using a laser beam, and the stereo image operation module 120 which computes the parallax image. These modules of the parallax operation system 100 are configured as follows.

The laser radar distance measurement module 110 is configured to synchronize with the stereo images taken by the image pickup units 710 and 720 which constitute the stereo cameras, so that the distance for the predetermined emission range may be measured at several emission angles in the turning direction.

The stereo image operation module 120 is configured to correlate the distance data read from the laser radar distance measurement module 110 with the pixels in the frame of a corresponding stereo image (reference image).

The stereo image operation module 120 is configured to compute parallaxes of pixels in the comparison image corresponding to the pixels with which the distance data is correlated, based on the distance data and the known distance between the stereo cameras.

The stereo image operation module 120 is configured to compute, when there is a pixel whose parallax is not computed among the pixels in the frame in which parallaxes are computed based on the stereo images, a parallax of the parallax-uncomputed pixel by using nearby pixels whose parallaxes are computed based on the distance data.

In this manner, the parallax operation system 100 according to this, embodiment is configured to interpolate the parallaxes computed based on the stereo images using the parallaxes computed based on the distances measured by the laser radar distance measurement module 110, and it is possible for the parallax operation system 100 according to this embodiment to increase the accuracy of parallax computation.

Third Embodiment

In the above-described first embodiment, the case in which the distances measured by the laser radar distance measurement module 110 are used by the energy computation unit 732 has been explained, and in the above-described second embodiment, the case in which the distances measured by the laser radar distance measurement module 110 are used by the parallax computation unit 733 has been explained.

However, the present invention is not limited to these embodiments. Alternatively, the stereo images may be processed by changing to a predetermined value luminance values of pixels in the reference image with which the distance data is correlated, and luminance values of pixels which lie in the position of the parallax d from the pixels in the comparison image corresponding to the pixels in the reference image. This is because the parallax computation may be facilitated by processing the pixels in an image portion with smooth texture in the stereo images.

Next, a parallax operation system according to a third embodiment is explained. In the following, only the differences of the third embodiment from the above-described first and second embodiments will be described.

Figure 20:
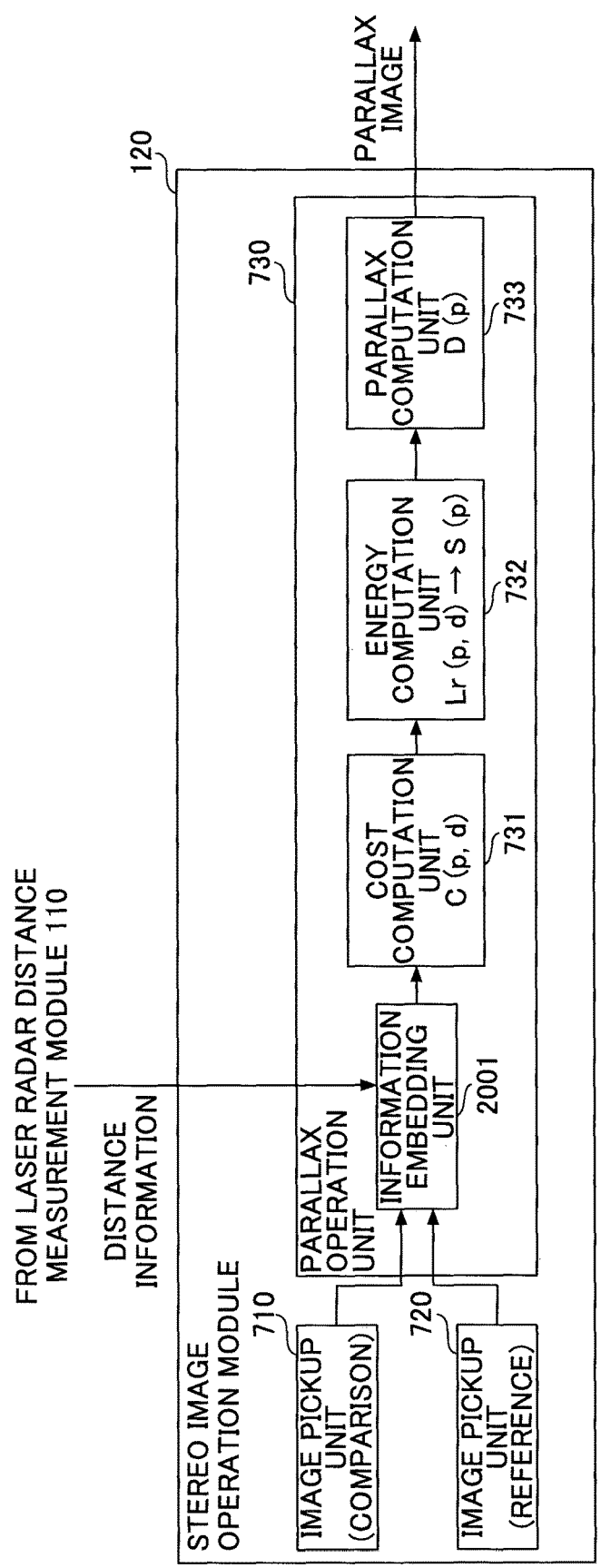
FIG. 20 is a diagram showing another functional configuration of the stereo image operation module.

First, a functional configuration of the stereo image operation module 120 in the parallax operation system 100 according to this embodiment is explained. FIG. 20 is a block diagram showing the functional configuration of the stereo image operation module 120 in the parallax operation system 100 according to this embodiment.

The stereo image operation module 120 according to this embodiment shown in FIG. 20 differs from the stereo image operation module 120 shown in FIG. 7 in that the distance information transmitted from the laser radar distance measurement module 110 is input to an information embedding unit 2001.

The information embedding unit 2001 is configured to extract pixels with which the distance data received from the laser radar distance measurement module 110 is correlated, from the pixels in the image 420 taken by the image pickup unit 720. Furthermore, the information embedding unit 2001 is configured to extract pixels which lie at positions of the parallax d, from the pixels in the image 410 corresponding to the extracted pixels in the image 420.

Moreover, the information embedding unit 2001 is configured to change luminance values of the extracted pixels in the image 410 and luminance values of the extracted pixels in the image 420 (both the extracted pixels correspond to each other and indicate the same object) to predetermined luminance values. Specifically, the information embedding unit 2001 is configured to change those initial luminance values to luminance values that enable changes of the energy values $S(p)$, subsequently computed by the energy computation unit 732, to be enlarged relative to changes of the parallax. Namely, the initial luminance values are changed to luminance values which are clearly different from the average luminance value of pixels surrounding the extracted pixels and are identical for the image 410 and the image 420.

Thereby, even in a case of an image portion with smooth texture, the computation of the parallaxes of the extracted pixels may be certainly performed and it is possible to increase the accuracy of parallax computation.

Next, an information embedding process performed by the information embedding unit 2001 is explained. FIGS. 21A and 21B are diagrams for explaining the information embedding process performed by the information embedding unit 2001.

It is assumed that, in the image 420 shown in FIG. 21A, distance data is correlated with each of the pixel of $(P_{x1}, P_{y1})$, the pixel of $(P_{x1}, P_{y2})$, the pixel of $(P_{x1}, P_{y3})$, and the pixel of $(P_{x1}, P_{y4})$, which lie in an emission range 520 of laser beams.

Here, it is assumed that $d_1$ denotes a parallax computed based on distance data $LD_1$ correlated with the pixel of $(P_{x1}, P_{y1})$, $d_2$ denotes a parallax computed based on distance data $LD_2$ correlated with the pixel of $(P_{x1}, P_{y2})$, $d_3$ denotes a parallax computed based on distance data $LD_3$ correlated with the pixel of $(P_{x1}, P_{y3})$, and $d_4$ denotes a parallax computed based on distance data $LD_4$ correlated with the pixel of $(P_{x1}, P_{y4})$.

In this case, the pixels in the image 410 which indicate the same object as the object indicated by the pixels of $(P_{x1}, P_{y1})$, $(P_{x1}, P_{y2})$, $(P_{x1}, P_{y3})$, and $(P_{x1}, P_{y4})$ in the image 420 are as follows.

$(P_{x1}, P_{y1}) \rightarrow (P_{x1}+d_1, P_{y1})$
$(P_{x1}, P_{y2}) \rightarrow (P_{x1}+d_2, P_{y2})$
$(P_{x1}, P_{y3}) \rightarrow (P_{x1}+d_3, P_{y3})$
$(P_{x1}, P_{y4}) \rightarrow (P_{x1}+d_4, P_{y4})$ The information embedding unit 2001 is configured to change initial luminance values of the extracted pixels in the image 410 and luminance values of the extracted pixels in the image 420 (both the extracted pixels correspond to each other and indicate the same object) to secondary luminance values which are clearly different from the average luminance value of pixels surrounding the extracted pixels and are identical for the image 410 and the image 420.

FIG. 21B shows a state in which initial luminance values of the pixels indicating the same position are changed to secondary luminance values by the information embedding unit 2001. Specifically, in FIG. 21B, the luminance values of the pixel of $(P_{x1}+d_1, P_{y1})$ in the image 410 and the pixel of $(P_{x1}, P_{y1})$ in the image 420 are changed to $g_1$, the luminance values of the pixel of $(P_{x1}+d_2, P_{y2})$ in the image 410 and the pixel of $(P_{x1}, P_{y2})$ in the image 420 are changed to $g_2$, the luminance values of the pixel of $(P_{x1}+d_3, P_{y3})$ in the image 410 and the pixel of $(P_{x1}, P_{y3})$ in the image 420 are changed to $g_3$, and the luminance values of the pixel of $(P_{x1}+d_4, P_{y4})$ in the image 410 and the pixel of $(P_{x1}, P_{y4})$ in the image 420 are changed to $g_4$.

It is assumed that the luminance values $g_1$, $g_2$, $g_3$, and $g_4$ are clearly different from the average luminance values of the surrounding pixels. In this manner, the computation of the parallaxes by the energy computation unit 732 may be certainly performed by identifying the pixels indicating the same object in the stereo images based on the distance information received from the laser radar distance measurement module 110, and changing the initial luminance values of the identified pixels. Hence, it is possible to increase the accuracy of parallax computation.

Figure 22:
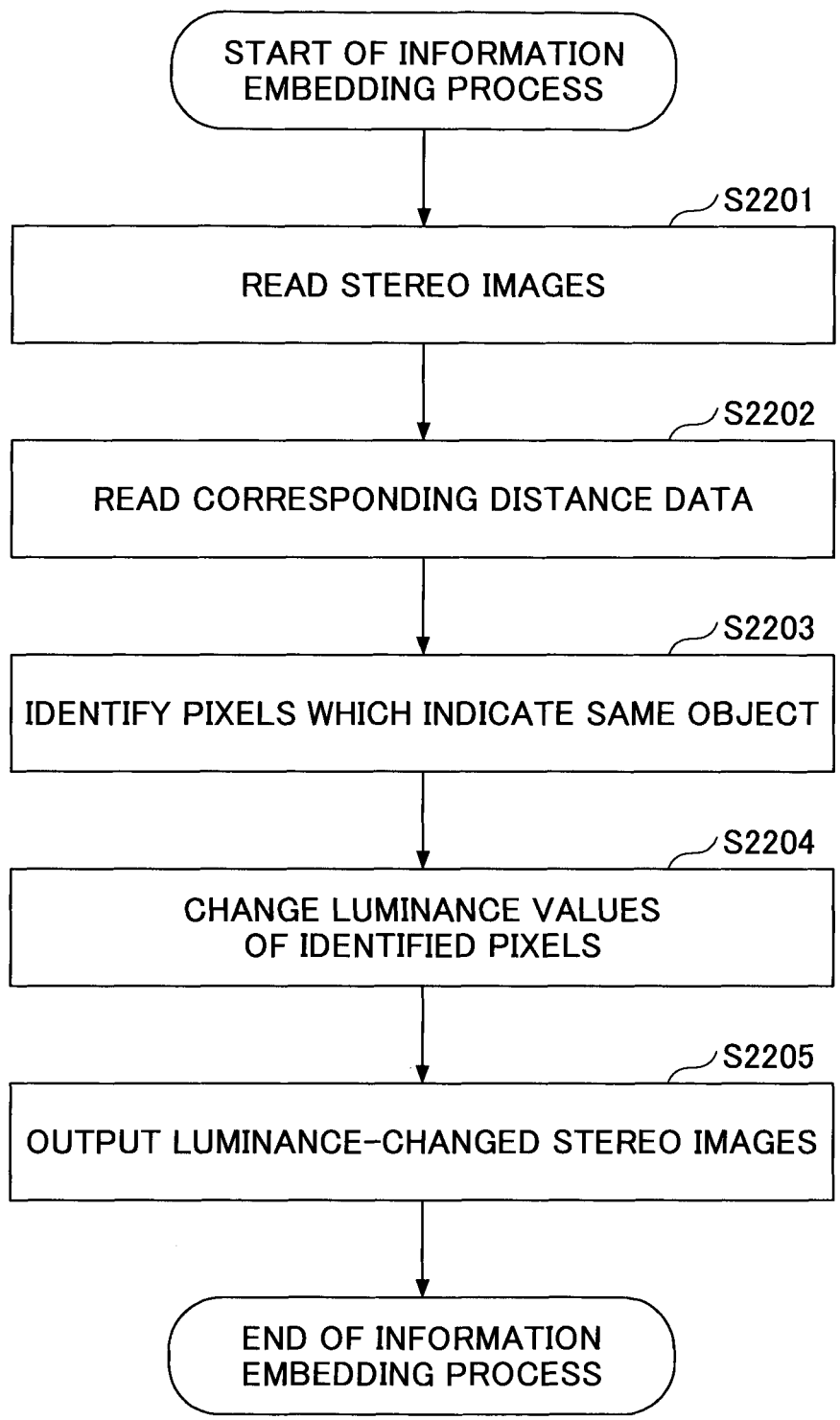
FIG. 22 is a flowchart for explaining an information embedding process performed by the information embedding unit.

Next, a flow of the information embedding process performed by the information embedding unit 2001 is explained. FIG. 22 is a flowchart for explaining the information embedding process performed by the information embedding unit 2001. Upon a start of the shooting by the image pickup unit 710 and the image pickup unit 720, the information embedding unit 2001 starts performing the information embedding process shown in FIG. 22. It should be noted that the information embedding process shown in FIG. 22 is performed repeatedly on a frame-by-frame basis for each of frames of stereo images, and in the example of FIG. 22, the information embedding process is performed on one frame of the stereo images.

As shown in FIG. 22, at step S2201, the information embedding unit 2001 reads the image taken by the image pickup unit 710 and the image taken by the image pickup unit 720. At step S2202, the information embedding unit 2001 reads the distances measured in synchronization with the images read at step S2201.

At step S2203, the information embedding unit 2001 identifies the pixels indicating the same object in each of the images read at step S2201, based on the distance data read at step S2202.

At step S2204, the information embedding unit 2001 changes the luminance values of the pixels identified at step S2203, respectively, in the above-described manner. At step S2205, the information embedding unit 2001 outputs the images in which the luminance values of the identified pixels are changed at step S2204, to the cost computation unit 731.

As described in the foregoing, the parallax operation system 100 according to this embodiment includes the laser radar distance measurement module 110 which measures the distance by using a laser beam, and the stereo image operation module 120 which computes the parallax image. These modules of the parallax operation system 100 are configured as follows.

The stereo image operation module 120 (or the information embedding unit 2001) is configured to identify pixels indicating the same object from among the pixels included in the frame of each of the stereo images, based on the distance data read from the laser radar distance measurement module 110.

The stereo image operation module 120 (or the information embedding unit 2001) is configured to change initial luminance values of the pixels identified based on the distance data to secondary luminance values which are clearly different from the average luminance value of pixels surrounding the extracted pixels and are identical for the comparison image and the reference image. The initial luminance values are changed to the secondary luminance values in the direction to roughen textures.

In this manner, the parallax operation system 100 according to this embodiment is configured to change the luminance values of the pixels in the frame of each of the stereo images based on the distance data read from the laser radar distance measurement module 110, which may facilitate the extraction of parallaxes by the energy computation unit 732. Hence, it is possible to increase the accuracy of parallax computation.

Fourth Embodiment

Figure 23:
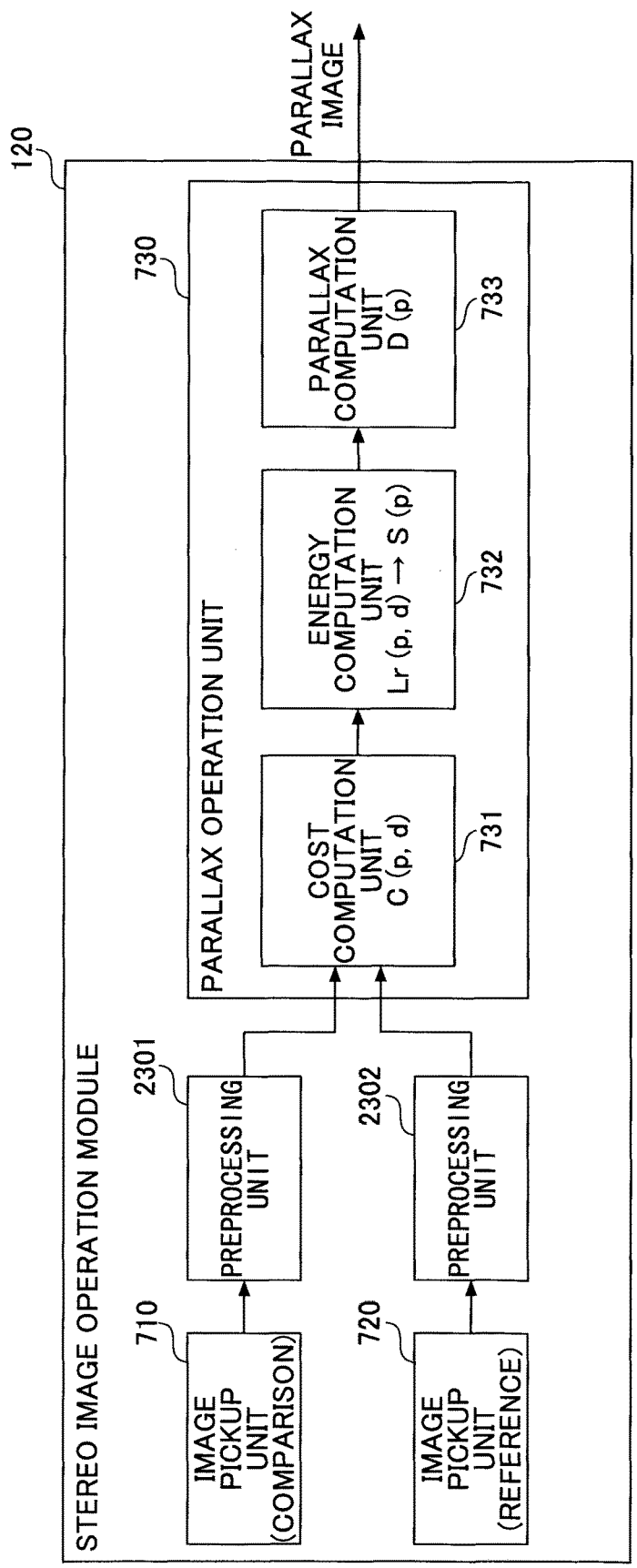
FIG. 23 is a diagram showing another functional configuration of the stereo image operation module.

In the foregoing embodiments, the case in which the image taken by the image pickup unit 710 and the image taken by the image pickup unit 720 are directly input to the parallax operation unit 730 has been described. However, the present invention is not limited to such embodiments. FIG. 23 is a diagram showing another functional configuration of the stereo image operation module 120. As shown in FIG. 23, a preprocessing unit 2301 and a preprocessing unit 2302 may be arranged in front of the parallax operation unit 730. Namely, after preprocessing is performed on the image taken by the image pickup unit 720 and the image taken by the image pickup unit 710, the preprocessed images may be input to the parallax operation unit 730.

The preprocessing performed by the preprocessing units 2301 and 2302 may include a noise elimination process, a distortion correction process, a gamma conversion process, etc. By performing the preprocessing, it is possible to increase the accuracy of parallax computation.

Fifth Embodiment

In the foregoing embodiments, the distance data is measured by the laser radar distance measurement module 110 at four measurement points in the emission range. However, the present invention is not limited to these embodiments. It is sufficient for the parallax operation system according to the present invention to measure the distance data at least at one or more measurement points in the emission range.

In the above first embodiment, by the energy computation unit 732, the number of pixels used as the starting point for the computation of propagation parameters is one. However, the present invention is not limited to this embodiment. The number of pixels used as the starting point for the computation of propagation parameters may be two or more.

In the above first embodiment, the block size used by the energy computation unit 732 when computing the cost is set to 1×1 pixel. However, the present invention is not limited to this embodiment. The block size used by the energy computation unit 732 when computing the cost may be two or more pixels.

In the above first embodiment, the extraction of the parallax from the parallax-energy graph is performed pixel by pixel (by an integer unit). However, the present invention is not limited to this embodiment. The extraction of the parallax from the parallax-energy graph may be performed by a fraction unit.

In the above first embodiment, when generating a parallax-energy graph, the parallax p is varied in a range of p=0 to 10. However, the present invention is not limited to this embodiment. The parallax may be varied in a wider range or in a narrower range.

In the above first embodiment, the propagation parameter for the parallax d of the pixel in the comparison image corresponding to the pixel in the reference image with which the distances measured by the laser radar distance measurement module 110 are correlated is used as the starting point for the computation of propagation parameters. However, the present invention is not limited to this embodiment. Alternatively, the parallax d may be included in the dense matching algorithm by another method.

In the above second embodiment, the laser radar distance measurement module is configured to emit laser beams at the three emission angles in the turning direction. However, the present invention may not be limited to this embodiment. Laser beams may be emitted at two emission angles in the turning direction, or at four or more emission angles in the turning direction.

In the foregoing embodiments, the laser radar distance measurement module 110 is configured so that the emission direction of the laser beam may be turned in the elevation-angle direction. However, the present invention is not limited to this example. The laser radar distance measurement module 110 may also be configured to emit a plurality of laser beams without turning the emission direction of the laser beams. Moreover, in the above fifth embodiment, the configuration employing a single fixed laser beam may also be used.

In the foregoing embodiments, the increase of the accuracy of parallax computation has been described as an advantageous effect of using the distances measured by the laser radar distance measurement module 110 for the generation of a parallax image by the stereo image operation module 120. The advantageous effect of the present invention is not limited to the embodiments. For example, the effect of increasing a recognition rate of an object on a road surface due to the increase of the accuracy of parallax computation may be included in the advantageous effect of the present invention.

In the foregoing embodiments, the distance information indicating a distance to an emission position of laser beams is acquired based on reflected laser beams of the laser beams emitted from the laser radar distance measurement module 110. However, the present invention is not limited to the embodiments. The distance information indicating a distance to an emission position may be acquired based on reflected waves of electromagnetic waves emitted from an electromagnetic-wave distance measurement module different from the laser radar distance measurement module 110.

The image processing apparatus and the parallax operation system according to the present invention are not limited to the above-described embodiments and various variations and modifications may be made without departing from the scope of the present invention.

The present application is based on and claims the benefit of priority of Japanese Patent Application No. 2013-268506, filed on Dec. 26, 2013, and Japanese Patent Application No. 2014-256864, filed on Dec. 19, 2014, the entire contents of which are hereby incorporated by reference.

DESCRIPTION OF REFERENCE NUMERALS

100 parallax operation system
110 laser radar distance measurement module
120 stereo image operation module
200 vehicle
410 image
420 image
520 emission range
601 signal processing unit
602 elevation-angle direction scan drive unit
603 motor
604 elevation-angle direction scan mirror
605 laser beam reception unit
606 signal amplifier
607 time interval counter
608 laser output unit
609 laser driver
710 image pickup unit
720 image pickup unit
730 parallax operation unit
731 cost computation unit
732 energy computation unit
733 parallax computation unit
1210-1214 pixels
1220 pixel
1711 emission range
1712 emission range
1713 emission range
1801 pixel
1802 pixel
2001 information embedding unit
2301 preprocessing unit
2302 preprocessing unit

PRIOR ART DOCUMENTS

Patent Documents

[Patent Document 1] Japanese Patent No. 3,212,218
[Patent Document 2] Japanese Patent No. 4,265,931

The invention claimed is:

1. An information processing apparatus which generates a parallax image based on images taken by a plurality of image pickup units, comprising:
a processor; and
a memory storing computer readable code that, when executed by the processor, causes the processor to act as
a correlation unit configured to correlate distance information indicating a distance to an emission position of electromagnetic waves emitted in a shooting direction of the plurality of image pickup units with a first pixel in a first image that constitutes the images, the distance information being obtained based on reflected waves of the electromagnetic waves and the first pixel corresponding to the emission position of the electromagnetic waves; and
a generation unit configured to generate a parallax image by using the distance information correlated with the first pixel for parallax computation of pixels in a second image that constitutes the images,
wherein the generation unit is configured to compute a parallax of a second pixel among the pixels in the second image, corresponding to the first pixel in the first image, based on the distance information correlated with the first pixel and a known distance between the plurality of image pickup units, and
wherein the generation unit is configured to compute propagation parameters of the pixels in the second image sequentially by using a dense matching algorithm based on a similarity of pixels in the first image and the pixels in the second image, compute energy values of the pixels in the second image according to an amount of deviation with the corresponding pixels in the first image, and compute parallaxes of the pixels in the second image based on changes of the computed energy values of the pixels in the second image according to changes of the amount of deviation.

2. The information processing apparatus according to claim 1, wherein the generation unit is configured to include the parallax of the second pixel in the dense matching algorithm and compute the propagation parameters sequentially.

3. The information processing apparatus according to claim 1, wherein the generation unit is configured to compute parallaxes of the pixels in the second image based on the distance information correlated with the first pixel and the known distance between the plurality of image pickup units, and configured to interpolate, when there is a pixel whose parallax is not computed based on changes of energy values computed for the pixels in the second image according to changes of the amount of deviation, a parallax of the parallax-uncomputed pixel by using the parallax of the second pixel computed based on the distance information correlated with the first pixel.

4. An information processing apparatus which generates a parallax image based on images taken by a plurality of image pickup units, comprising:
a processor; and
a memory storing computer readable code that, when executed by the processor, causes the processor to act as
a correlation unit configured to correlate distance information indicating a distance to an emission position of electromagnetic waves emitted in a shooting direction of the plurality of image pickup units with a first pixel in a first image that constitutes the images, the distance information being obtained based on reflected waves of the electromagnetic waves and the first pixel corresponding to the emission position of the electromagnetic waves; and a generation unit configured to generate a parallax image by using the distance information correlated with the first pixel for parallax computation of pixels in a second image that constitutes the images, wherein the generation unit is configured to compute a parallax of a second pixel among the pixels in the second image, corresponding to the first pixel in the first image, based on the distance information correlated with the first pixel and a known distance between the plurality of image pickup units, and wherein the generation unit is configured to change both a luminance value of the first pixel in the first image and a luminance value of a pixel in the second image at a position according to the parallax of the second pixel in the second image to secondary luminance values and process the images after the luminance value of the first pixel and the luminance value of the pixel are changed to the secondary luminance values.

5. A parallax operation system including a plurality of image pickup units, an electromagnetic wave distance measurement unit, and an information processing apparatus, the information processing apparatus comprising a memory storing computer readable code that, when executed by a processor, configures the processor as:

an acquisition unit configured to acquire images taken by the plurality of image pickup units;

a correlation unit configured to correlate distance information indicating a distance to an emission position of electromagnetic waves emitted in a shooting direction of the plurality of image pickup units with a first pixel in a first image that constitutes the images, the distance information being obtained based on reflected waves of the electromagnetic waves, and the first pixel corresponding to the emission position of the electromagnetic waves; and a generation unit configured to generate a parallax image by using the distance information correlated with the first pixel for parallax computation of pixels in a second image that constitutes the images, wherein the generation unit is configured to compute a parallax of a second pixel among the pixels in the second image, corresponding to the first pixel in the first image, based on the distance information correlated with the first pixel and a known distance between the plurality of image pickup units, and wherein the generation unit is configured to compute propagation parameters of the pixels in the second image sequentially by using a dense matching algorithm based on a similarity of pixels in the first image and the pixels in the second image, compute energy values of the pixels in the second image according to an amount of deviation with the corresponding pixels in the first image, and compute parallaxes of the pixels in the second image based on changes of the computed energy values of the pixels in the second image according to changes of the amount of deviation.

6. The parallax operation system according to claim 5, wherein the electromagnetic wave distance measurement unit is configured to emit the electromagnetic waves so that an emission range of the electromagnetic waves is set in a road surface portion included in the images taken by the plurality of image pickup units.

7. The parallax operation system according to claim 5, wherein the electromagnetic wave distance measurement unit is configured to receive a plurality of distance information items by changing an emission direction of the electromagnetic waves when the images are taken by the plurality of image pickup units.

8. An information processing method for use in a parallax operation system including a plurality of image pickup units, an electromagnetic wave distance measurement unit, and an information processing apparatus, the method comprising:

acquiring images taken by the plurality of image pickup units;

correlating distance information indicating a distance to an emission position of electromagnetic waves emitted in a shooting direction of the plurality of image pickup units with a first pixel in a first image that constitutes the images, the distance information being obtained based on reflected waves of the electromagnetic waves, and the first pixel corresponding to the emission position of the electromagnetic waves;

generating a parallax image by using the distance information correlated with the first pixel for parallax computation of pixels in a second image that constitutes the images;

computing a parallax of a second pixel among the pixels in the second image, corresponding to the first pixel in the first image, based on the distance information correlated with the first pixel and a known distance between the plurality of image pickup units; and computing propagation parameters of the pixels in the second image sequentially by using a dense matching algorithm based on a similarity of pixels in the first image and the pixels in the second image, compute energy values of the pixels in the second image according to an amount of deviation with the corresponding pixels in the first image, and compute parallaxes of the pixels in the second image based on changes of the computed energy values of the pixels in the second image according to changes of the amount of deviation.

9. A non-transitory computer-readable recording medium storing a program of computer readable code that, when executed by a computer, causes the computer to perform the information processing method according to claim 8.

10. A parallax operation system, comprising:

a plurality of image pickup units;

an information processing apparatus configured to generate a parallax image based on images taken by the plurality of image pickup units;

a processor;

a memory storing computer readable code that, when executed by the processor, causes the processor to act as a correlation unit configured to correlate distance information indicating a distance to an emission position of electromagnetic waves emitted in a shooting direction of the plurality of image pickup units with a first pixel in a first image that constitutes the images, the distance information being obtained based on reflected waves of the electromagnetic waves and the first pixel corresponding to the emission position of the electromagnetic waves; and a generation unit configured to generate a parallax image by using the distance information correlated with the first pixel for parallax computation of pixels in a second image that constitutes the images, wherein the generation unit is configured to compute a parallax of a second pixel among the pixels in the second image, corresponding to the first pixel in the first image, based on the distance information correlated with the first pixel and a known distance between the plurality of image pickup units, and wherein the generation unit is configured to change both a luminance value of the first pixel in the first image and a luminance value of a pixel in the second image at a position according to the parallax of the second pixel in the second image to secondary luminance values and process the images after the luminance value of the first pixel and the luminance value of the pixel are changed to the secondary luminance values.

11. An information processing method, comprising:

acquiring images taken by a plurality of image pickup units;

correlating distance information indicating a distance to an emission position of electromagnetic waves emitted in a shooting direction of the plurality of image pickup units with a first pixel in a first image that constitutes the images, the distance information being obtained based on reflected waves of the electromagnetic waves, and the first pixel corresponding to the emission position of the electromagnetic waves;

generating a parallax image by using the distance information correlated with the first pixel for parallax computation of pixels in a second image that constitutes the images computing a parallax of a second pixel among the pixels in the second image, corresponding to the first pixel in the first image, based on the distance information correlated with the first pixel and a known distance between the plurality of image pickup units; and changing both a luminance value of the first pixel in the first image and a luminance value of a pixel in the second image at a position according to the parallax of the second pixel in the second image to secondary luminance values and process the images after the luminance value of the first pixel and the luminance value of the pixel are changed to the secondary luminance values.

12. A non-transitory computer-readable recording medium storing a program of computer readable code that, when executed by a computer, causes the computer to perform the information processing method according to claim 11.

* * * * *